US008620738B2

(12) United States Patent
Fordyce, III et al.

(10) Patent No.: US 8,620,738 B2
(45) Date of Patent: Dec. 31, 2013

(54) LOYALTY PROGRAM INCENTIVE DETERMINATION

(75) Inventors: Edward W. Fordyce, III, Hagerstown, IN (US); Karteek Hasmukh Patel, San Francisco, CA (US); David Chauncey Shepard, Novato, CA (US)

(73) Assignee: Visa U.S.A. Inc, San Francisco, CA (US)

( * ) Notice: Subject to any disclaimer, the term of this patent is extended or adjusted under 35 U.S.C. 154(b) by 1366 days.

(21) Appl. No.: 11/848,112

(22) Filed: Aug. 30, 2007

(65) Prior Publication Data

US 2008/0059306 A1    Mar. 6, 2008

Related U.S. Application Data

(60) Provisional application No. 60/824,275, filed on Aug. 31, 2006, provisional application No. 60/824,426, filed on Sep. 1, 2006, provisional application No. 60/915,079, filed on Apr. 30, 2007, provisional application No. 60/895,111, filed on Mar. 15, 2007.

(51) Int. Cl.
*G06Q 30/02* (2012.01)
*G06Q 30/00* (2012.01)

(52) U.S. Cl.
USPC .......................... 705/14.3; 705/14.4

(58) Field of Classification Search
None
See application file for complete search history.

(56) References Cited

U.S. PATENT DOCUMENTS

| | | |
|---|---|---|
| 5,025,372 A | 6/1991 | Burton et al. |
| 5,471,669 A | 11/1995 | Lidman |
| 5,689,100 A | 11/1997 | Carrithers et al. |
| 5,734,838 A | 3/1998 | Robinson et al. |
| 5,855,008 A | 12/1998 | Goldhaber et al. |
| 5,945,653 A | 8/1999 | Walker et al. |
| 6,009,411 A | 12/1999 | Kepecs |
| 6,014,635 A | 1/2000 | Harris et al. |
| 6,061,660 A | 5/2000 | Eggleston et al. |
| 6,105,001 A | 8/2000 | Masi et al. |
| 6,222,914 B1 | 4/2001 | McMullin |
| 6,332,126 B1 | 12/2001 | Pierce et al. |
| 6,405,174 B1 | 6/2002 | Walker et al. |
| 6,694,300 B1 | 2/2004 | Walker et al. |
| 6,876,971 B1 | 4/2005 | Burke |
| 6,937,995 B1 | 8/2005 | Kepecs |
| 6,965,868 B1 * | 11/2005 | Bednarek ..................... 705/7.14 |
| 7,219,071 B2 | 5/2007 | Gallagher |
| 7,344,066 B1 * | 3/2008 | Ramachandran ............. 235/379 |

(Continued)

OTHER PUBLICATIONS

International Patent Application PCT/US07/77039, International Preliminary Report on Patentability, Dec. 25, 2008.

(Continued)

*Primary Examiner* — Matthew T Sittner
(74) *Attorney, Agent, or Firm* — Greenberg Traurig, LLP

(57) ABSTRACT

The eligibility of an transaction between a consumer and a merchant toward an incentive for a loyalty program is determined using a globally unique identifier (GUID) matching algorithm. Information characterizing the transaction may include a GUID for the merchant and a GUID for an account of the consumer on which the transaction is payable. The GUIDs are each matched against GUIDs of merchants and accounts stored in a database, some of which are distinguished as loyalty program participants. When both the GUID for the merchant and the GUID for the account match with respective GUIDs in the database that are distinguished as loyalty program participants, the transaction is eligible toward the incentive.

22 Claims, 6 Drawing Sheets

(56) References Cited

U.S. PATENT DOCUMENTS

| | | |
|---|---|---|
| 7,392,224 B1 | 6/2008 | Bauer et al. |
| 7,665,660 B2 | 2/2010 | Degliantoni et al. |
| 7,844,490 B2 | 11/2010 | Patterson |
| 2001/0054003 A1 | 12/2001 | Chien et al. |
| 2002/0002533 A1* | 1/2002 | Singhal .................. 705/39 |
| 2002/0013765 A1* | 1/2002 | Shwartz .................. 705/39 |
| 2002/0077969 A1* | 6/2002 | Walker et al. ............ 705/38 |
| 2002/0143626 A1 | 10/2002 | Voltmer et al. |
| 2003/0028451 A1 | 2/2003 | Ananian |
| 2003/0033211 A1* | 2/2003 | Haines et al. ............ 705/26 |
| 2003/0088462 A1 | 5/2003 | Carrithers et al. |
| 2003/0130895 A1 | 7/2003 | Antonucci et al. |
| 2003/0149623 A1 | 8/2003 | Chen |
| 2003/0212654 A1* | 11/2003 | Harper et al. ............ 707/1 |
| 2004/0019522 A1* | 1/2004 | Bortolin et al. .......... 705/14 |
| 2004/0068435 A1 | 4/2004 | Braunzell |
| 2004/0215543 A1* | 10/2004 | Betz et al. ............... 705/35 |
| 2005/0004836 A1 | 1/2005 | Ruttenberg |
| 2005/0004839 A1* | 1/2005 | Bakker et al. ............ 705/14 |
| 2005/0021399 A1 | 1/2005 | Postrel |
| 2005/0021400 A1 | 1/2005 | Postrel |
| 2005/0177750 A1* | 8/2005 | Gasparini et al. ........ 713/201 |
| 2005/0187873 A1* | 8/2005 | Labrou et al. ............ 705/40 |
| 2005/0203966 A1 | 9/2005 | Labrou et al. |
| 2005/0267842 A1* | 12/2005 | Weichert et al. ......... 705/40 |
| 2005/0289001 A1 | 12/2005 | Parnau |
| 2006/0000900 A1 | 1/2006 | Fernandes et al. |
| 2006/0195359 A1 | 8/2006 | Robinson et al. |
| 2006/0253320 A1 | 11/2006 | Heywood |
| 2007/0001016 A1 | 1/2007 | Hunter, Jr. et al. |
| 2007/0022048 A1 | 1/2007 | Kingsborough et al. |
| 2007/0150352 A1 | 6/2007 | Kelly-Frank et al. |
| 2007/0185821 A1 | 8/2007 | Wells et al. |
| 2008/0059302 A1 | 3/2008 | Fordyce, III |
| 2008/0059303 A1 | 3/2008 | Fordyce, III |
| 2008/0059307 A1 | 3/2008 | Fordyce, III |
| 2008/0114657 A1* | 5/2008 | Forzley .................... 705/14 |
| 2008/0133351 A1 | 6/2008 | White et al. |
| 2008/0154676 A1* | 6/2008 | Suk ......................... 705/7 |
| 2008/0228582 A1 | 9/2008 | Fordyce, III |
| 2009/0006203 A1 | 1/2009 | Fordyce, III |
| 2009/0259560 A1 | 10/2009 | Bachenheimer |
| 2010/0169170 A1 | 7/2010 | Fordyce, III |
| 2011/0004514 A1 | 1/2011 | Thomas |

OTHER PUBLICATIONS

International Patent Application PCT/US07/77039, International Search Report and Written Opinion, Aug. 25, 2008.

International Patent Application PCT/US07/77285, International Preliminary Report on Patentability, Apr. 2, 2009.

International Patent Application PCT/US07/77285, International Search Report and Written Opinion, Feb. 26, 2008.

International Patent Application PCT/US07/77440, International Search Report and Written Opinion, Feb. 11, 2008.

International Patent Application PCT/US07/77447, International Search Report and Written Opinion, Jun. 25, 2008.

International Patent Application PCT/US08/57128, International Search Report and Written Opinion, Jul. 17, 2008.

International Patent Application PCT/US08/61890, International Search Report and Written Opinion, Sep. 22, 2008.

Saranow, Jennifer et al., Proclamation Points Reward!: for Spending Cash at Dealership or Using Automaker's Credit Card Accumulate Points and Use Toward Services or Vehicle Purchase, Chicago Sun-Times, p. A60, Jun. 4, 2006.

* cited by examiner

LOYALTY PROGRAM INCENTIVE DETERMINATION

CROSS-REFERENCES TO RELATED APPLICATIONS

This application is a Non-Provisional Application and claims priority to and the benefit of U.S. Provisional Patent Application Ser. No. 60/824,275 (entitled "Loyalty Programs and Services," filed Aug. 31, 2006), the entire contents of which is hereby incorporated by reference; this application also claims priority to and the benefit of U.S. Provisional Patent Application Ser. No. 60/824,426 (entitled "Method and System for Loyalty Programs and Services," filed Sep. 1, 2006), the entire contents of which is hereby incorporated by reference; this application also claims priority to and the benefit of U.S. Provisional Patent Application Ser. No. 60/915,079 (entitled "Transaction Data Matching," filed Apr. 30, 2007), the entire contents of which is hereby incorporated by reference; and this application also claims priority to and the benefit of U.S. Provisional Patent Application Ser. No. 60/895,111 (entitled "Point of Service Discounting," filed Mar. 15, 2007), the entire contents of which is hereby incorporated by reference.

FIELD

The present invention generally relates to loyalty programs and more particularly, to methods, systems and apparatus loyalty program incentive determination.

BACKGROUND

Loyalty programs provide consumers with incentives to shop at certain loyalty program participating facilities or to show loyalty to a particular merchant or service provider, such as a financial institution. In addition, to receiving discounts or financial awards, an incentive may include redeemable goods or services, or special recognition of some sort, such as an upgrade. Often, financial institutions, such as an issuing bank or acquiring bank, support the loyalty program. Loyalty programs may be associated with various transaction programs such as a credit card program, a charge card program, a debit card program, a prepaid card program, or a gift card program.

A degree of success of a loyalty program is how well it can target consumers that will participate in the program in order to receive the incentives described and provided as part of the loyalty program.

These loyalty programs are typically constructed, marketed, qualified, fulfilled, or refined with limited interaction between the various participants of the programs, which may include merchants, financial institutions such as acquirers and issuers, transaction handlers such as credit card companies, and consumers such as an account holder. For example, a merchant wishing to participate in a co-branded credit card program may be confined to loyalty program features set by the issuing bank such as a credit limit, a bonus mile to purchase ratio, or a redemption option thereby not being able to finely target the merchant's potential consumers. The level of loyalty program feature confinement is especially prominent among merchants with a smaller portion of the market.

Moreover, loyalty programs may be developed with limited access to detailed transaction data. For example, some loyalty program participants, such as financial institutions, may rely on their own transaction data history to determine the type of incentive to provide. However, this data history may be limited in scope depending on the degree of transaction specificity the issuer collects or is able to maintain. Similarly, merchants wishing to set up a loyalty program may solicit financial institutions for information, gaining limited access to the full scope of the transaction data. Even if a merchant gains access to the transaction data, the transaction data may not be in a form the merchant can effectively utilize.

The lack of uniformity in handing transaction data may hamper accurate communication between participants of the transaction program. For example, acquirers may identify a single merchant differently; one acquirer may identify a merchant by its name and address while another acquirer may identify the same merchant by its name and franchise store number. Similarly, each participant of the loyalty program may be accustomed to processing transaction data in a particular format that may not be the same as the format of another participant of the loyalty program. For example, an airline company may analyze transaction data in units of "bonus miles per dollar" while an issuer may record dollars spent per month.

Therefore, packaged loyalty program services of a financial institution may not properly meet the needs of merchants that could otherwise benefit from loyalty programs. Often, loyalty program participants lack detailed information about transactions and, thus, fail to create an effective and targeted program that is refined to meet the specific needs of those funding the programs. It would be an advance in the art to provide a platform for collaborating to develop, implement and refine transaction programs in a way that lessens the foregoing drawbacks.

SUMMARY

The determination of a loyalty program incentive for a transaction between a consumer and a merchant is facilitated using an identifier (GUID) for a merchant that is globally unique within a payment processing system. In one implementation, data regarding the transaction includes the GUID for the merchant and an identifier for an account (e.g., account number) that the transaction is payable on. The GUIDs for the merchant and the account are matched against GUIDs for a plurality of merchants and accounts, respectively, within a database. The database, such as a loyalty program database, can have at least one account and one merchant that are each distinguished, in association with the database, as a loyalty program participant. When both the GUID for the merchant and the identifier for the account find corresponding matches in the database and the matches reveal that the account and the merchant are participants of the loyalty program, the transaction is eligible towards an incentive for the loyalty program. The GUID for the merchant may be derived given a merchant code that may not be unique within the payment processing system. Moreover, the determination of the eligibility of the transaction toward the incentive may further entail matching a good or a service identifier (e.g., Stock Keeping Unit number) against identifiers of goods or services within the database, wherein some of the identifiers of the goods or services in the database are distinguished, in association with the database, as a participant of the loyalty program.

In another implementation, the eligibility of the transaction towards an incentive within a loyalty program is determined. Identifiers for the account (e.g., a GUID for the account) and the GUID for the merchant are matched against identifiers of accounts and GUIDs for the merchants, some of which are participants of the loyalty program, within a database. The database can have at least one account and one merchant that are each distinguished, in association with the database, as a loyalty program participant. The value of the incentive may be calculated using a loyalty program business rule and information regarding the incentive may be related to the consumer, the merchant, or those facilitating the implementation of the loyalty program.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

Implementations enable collaborative constituents to collaborate to construct, implement, refine, or a combination thereof, a loyalty program. For example, entities within a transaction processing system (e.g., transaction processing environment) may become collaborative constituents collaborating during various phases of the loyalty program. The transaction processing system may be a payment processing system such a system having entities including a credit card company, an issuer, an acquirer, a consumer, and a merchant.

Figure 1:
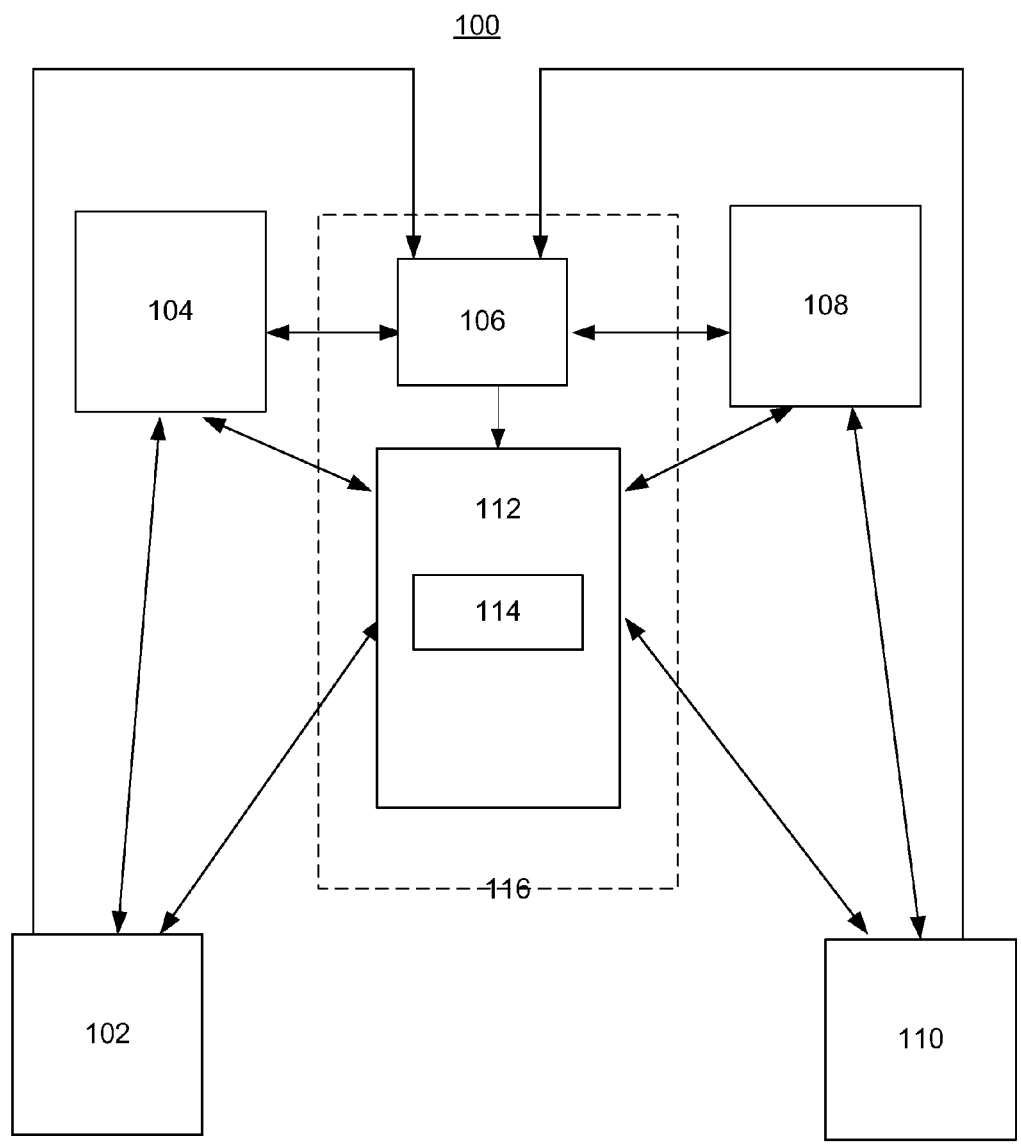
FIG. 1 is a schematic illustrating an exemplary system for collaborating to develop, implement, and refine a loyalty program via a platform configured to be accessible to various collaborative constituents.

Referring to FIG. 1, an exemplary system or environment is illustrated for collaborative constituents to collaborate on developing, implementing, and refining a loyalty program 114 via a platform 112.

The collaborative constituent may include a consumer 102 such as an account holder in the transaction processing system, an issuer 104, a transaction handler 106 such as a credit card company, an acquirer 108, or a merchant 110. The merchant 110 may be a person or entity that sells a commodity such as a good, a service, or a combination thereof. Examples of the merchant 110 include: a manufacturer, a distributor, a retailer, a load agent, a service provider, or a healthcare provider. In a business-to-business setting, the consumer 102 may be a second merchant making a purchase from the merchant 110. Third-party processors may perform many operational support tasks on behalf of the collaborative constituent, such as creative agencies, loyalty program marketing agencies or consultants, business intelligence companies or consultants, letter shops, Email and Short Message Service (SMS) or Text message delivery agencies, and registered card loyalty program companies.

A participant of the loyalty program 114 can be, but need not be one of the collaborative constituent. For example, the franchiser McDonald's Corporation may be one of the collaborative constituents having a McDonald's® loyalty program accessible through the platform 112 and one of a McDonald's® loyalty program participant; however, a single McDonald's® store located in Los Angeles, Calif. may not be one of the collaborative constituents but be one of the McDonald's® loyalty program participant wherein purchases made at the single McDonald's® restaurant would qualify for the McDonald's® loyalty program.

The platform 112 can be a forum accessible via a network, the Internet, an extranet, a wireless network, a wire line network, a local area network, a wide area network, a messaging system, a correspondence system, or a telephone system that is a market place for collaborative constituents to interact to construct, implement, and refine the loyalty program 114. The platform 112 may be a part of the transaction handler 106 as denoted by broken lines 116 in FIG. 1.

The platform 112 can be scaled to meet the needs of any number of the collaborative constituents. For example, the platform 112 may be configured to accommodate a small or a large number of collaborative constituents, globally, in multiple languages.

Moreover, the platform 112 can be scaled to meet the needs of the participants of the loyalty program 114. For example, the number of participants of the loyalty program 114 for each entity may vary, such as having several franchisees as the participants of the loyalty program 114 for a single franchisor. Similarly, the platform 112 may be configured to allow different numbers of entities to participate in the loyalty program 114. For example, the merchant 110 can be a single merchant that may interact with a single financial institution to create and maintain the loyalty program 114. Conversely, a large number of merchants can create the loyalty program 114 through interaction with a large number of financial institutions. For example, all merchants 110 selling clothing in the southwest can interact with several banks, such as Wells Fargo and Bank of America, to create and maintain the loyalty program 114.

Moreover, the platform 112 may be configured to accommodate modularity in the loyalty program 114. The modularity in the loyalty program 114 includes the loyalty program 114 that has the characteristic of being versatile, allowing for a combination of diverse parameters. The loyalty program 114 may be created in an a la carte fashion having parameters that mimic those in a pre-existing loyalty program and other parameters that may be unique or did not exist before. For example, the loyalty program 114 may have parameters include a point to cash back ratio mimicking a pre-existing loyalty program.

The collaborative constituents may set up a profile within the platform 112. The platform 112 may have a secure Internet setting configured to allow the collaborative constituent access to the platform 112. The profile may include information about the collaborative constituent. For example, the consumer 102 may set up a profile including information about the consumer 102 such as a the consumer's 102 name, the consumer's 102 address, the consumer's 102 account number for an account within the transaction processing system, the consumer's 102 inputted data such as preference for particular promotion or preference for a channel for receiving promotions, a promotion category that the consumer 102 would like to receive promotions for, or the consumer's 102 shopping habits, for example. The issuer 104 may set up a profile including information about the issuer 104 such as an issuer unique identifier within the transaction processing system (a global unique identifier (GUID) that distinguishes the issuer 104 within the transaction processing system); the issuer's 104 address; standard loyalty program business rules typically proposed by the issuer 104 for a plurality of the loyalty programs 114; the issuer's 104 loyalty program fulfillment options (e.g., credit to statement or cash back); the issuer's 104 standard loyalty program parameters, such as cardholder accounts participating, branding requirements and other business rules; and information on third parties that act as proxies to the issuer 104. The acquirer 108 may set up a profile including information about the acquirer 108 such as an acquirer unique identifier (a GUID that distinguishes the acquirer 108 within the transaction processing system), the acquirer's 108 address, a settlement request, a acquirer identification for the merchant 110 that is a client of the acquirer 108, or accumulated merchant daily sale report. The transaction handler 106 may set up a profile including information about the transaction handler 106 such as transaction message field formatting requirements, authorization standards for a transaction amount, credit card spending limits by credit card type, or demographic analysis. The merchant 110 may set up a profile including information about the merchant 110 such as a merchant unique identifier (e.g., a GUID for the merchant 110 that distinguishes the merchant 110 within the transaction processing system), a merchant code that may be nonunique globally, franchise codes, or a loyalty program business rules that the merchant 110 typically utilizes, for example.

The collaborative constituents can access the platform 112, via the Internet for example, to negotiate parameters of the loyalty program 114 such that a negotiated set of parameters for the loyalty program 114 forms a negotiated agreement to the parameters of the loyalty program 114. The negotiated set of parameters for the loyalty program 114 are those parameters that remain after the negotiation is completed among the collaborative constituents, such that the collaborative constituents left in the negotiation process all agree to the remaining parameters. Thereafter, the collaborative constituents can implement and refine or alter the remaining parameters of the loyalty program 114, such as by changing a value of the reward associated with the loyalty program.

Each of the collaborative constituent, such as the merchant 110, may submit a proposal, via the platform 112, for the loyalty program 114 containing a parameter that governs the creation and/or implementation of the loyalty program 114. The parameter transmitted in the proposal may be predetermined such that the merchant 110 can pick the parameter a la cart within a menu provided at the platform 112, or the parameters may be customized. A parameter may include, for example, the duration of a promotion within the loyalty program 114, the good or service promoted, the value of the promotion, or a loyalty program business rule such as an algorithm to determine whether a purchase qualifies for the promotion. To illustrate, the merchant 110 may propose a loyalty program business rule as a parameter having a form of: "if variable one occurs then offer variable two." Standard promotions that the merchant 110 may propose include: discounts (e.g., "ten (10%) percent off a purchase of socks if you use a Nordstrom® credit card"), rewards, coupons, and spent-and-get promotions. A coupon promotion may be structured such that if the consumer 102 uses an account associated with the transaction processing system to make a purchase at the merchant 110 store that exceeds $100 U.S. in value, then ten (10) percent will be taken off the purchase value at the merchant's 110 point of service (POS) device. Similarly, the promotion may be a spend-and-get promotion such as if the consumer 102 conducts four purchases made with the account associated with the transaction processing system at the merchant's 110 store the consumer's 102 fifth purchase at the merchant's 110 store will result in $10.00 U.S. being credited to the account. Other variables that can be included in the loyalty program business rule include: an upgrade in a value of a commodity being purchased, a discount on a price of the commodity being purchased, a rebate, a statement credit for an account within the transaction processing system and associated to the consumer 120, or a combination of the foregoing.

The merchant 110 may also select the type of the consumer 102 it wishes to target the promotion to at the platform 112. For example, the merchant 110 may want to target the consumer 102 based on geographical location or the consumer's 102 transaction history. The merchant's 110 proposal may indicate that the promotion should be targeted to the consumers 102 living within 10 miles from the location of one of the merchant's 110 franchisee stores. Alternatively, or in combination, the merchant's 110 proposal may indicate that the promotion should be targeted to the consumers 102 that have purchased a particular good or service in the past—such as the consumers 102 that have purchased baseball cards at competitor stores within the past two months. For example, the merchant 110 may wish to target consumers 102 that have purchased Digital Video Discs "DVDs" in the past, the transaction handler 106 may mine a database containing a plurality of the consumer's 102 transaction histories, looking for trends of purchases dealing with DVDs. Moreover, once a set of eligible consumers is identified, the transaction handler 106 may query the merchant 110 to refine the set of eligible consumers.

An exemplary template for establishing a loyalty program or merchant promotion (114) on the platform (112) is as follows:

Merchant Name:
Originator's Contact:
Date of Request:
Description of project:
What are the business objectives?
Describe the marketing environment: names of competitors, current attitudes of target audience(s), etc.:
Provide logo, if applicable
What are the business objectives?
What are the main benefits of this project to each audience, in order of priority?
What is the key message we want to communicate to each audience?
What do we want each audience to do or believe as a result of this project?
What Transaction Processor materials would provide background information? (Please attach.)
Additional information or direction:
What information would help Marketing Communications and Agency determine the copy tone or style for the overall project? Do certain components need a different tone?
What type of copy input will be provided (copy points, brochures, Uniform Resource Locators "URLs")?
What information would help Marketing Communications and Agency determine the design tone or style for the overall project?
Are there any print production issues or requirements for this project?
Offer Period:
Offer Redemption Process (e.g. coupon, statement credit). (If using bar codes, specify type, positioning, size and other requirements here).
Will offer be available online?
If offer will be available online, provide online code requirements. Attach additional spreadsheet if needed.
Will offer be available via catalog?

If offer will be available via catalog, provide code and requirements.
Attach additional spreadsheet if needed.
Creative branding guidelines and considerations. If branding guidelines are available, please provide here as well.
Delivery method
   Letter with coupon
   Buckslip
   Insert (if doing an insert, please provide size and specs)
   e-mail
   mobile
Cashier instructions (to be placed on coupon):
Merchant messaging (if applicable):
Phone number and/or URL for offer:
Who will review each round of creative?
How many days should we schedule for originator's group to review rounds if different than a normal transaction handler review time?
List the primary and secondary target audience(s).
Potential audience/segments:
Will there be a customer suppression list? If so, please provide description and date this will be available (see Customer Suppression File Format)
Will a Merchant Store Location List be provided for geo-coding purposes (if applicable)?
Please describe any targeting requirements:
Location/Geographies:
Type of program output:
   Qualified Transactions Only
   Calculated Awards
   Discounts
   Bonus Points
   Statement Credits
   Discount File
Transaction Purchase Start Date:
Transaction Purchase End Date:
Cardholder Selection Criteria
If transactions will be qualified based on cardholder information, please complete this section.
Transactions will be identified at the following level:
   an Issuer code
   Issuer Card Range
   Issuer Bank Identification Number (BIN)
   Participating/Eligible Cardholder List
Approximate number of participating/eligible cardholders:
Cardholder files will be updated with the following frequency:
   Daily
   Weekly
   Monthly
   Other—Please specify below:
Transaction files will be delivered with the following frequency:
   Daily
   Weekly
   Monthly
   At the end of the promotion period
   Other—Please specify below:
Selection Criteria
If transactions will be qualified based on specific information, please provide selection criteria.
Transactions will be qualified based on (check one):
   Acquirer BIN(s)
   Merchant Category Codes
   List of Specific Participating Merchants
   Merchant Identifiers
   Merchant GUID
   Other (specify);
Additional Transaction Selection Criteria
Please briefly describe any additional targeting qualification criteria that must be applied.
Option Limits
Applies only if calculating awards.
Program Limits:
   Money Unit amount
   Points
   Number of Awards
Please specify below:
Option Limits
Applies only if calculating awards.
Cardholder Limits:
   Money Unit amount
   Points
   Number of Awards
Bonus Processing:
Please list the bonus point ratio here.
Statement Credits
How is the program funded?
   Merchant funded
   Issuer funded
   Transaction Processor funded
   Third party loyalty provider
Funding BIN
Please specify funding BIN for statement credit processing
An exemplary template for establishing a loyalty program profile includes:
1. Please select whether your promotion(s) should be provided to:
   a. Consumers
   b. Small businesses
   c. Large corporations
   d. Government entities
   e. Other commercial entities
   f. A combination of the foregoing.
2. Please select the objective for your promotion: (tips/templates on ads/promotions that work for the merchant's stated industry may be suggested—the tips/templates will change based upon objectives and the issuer 104 can edit the parameters and copy etc.)
   a. Reward existing customers
   b. Increase spend from existing customers
   c. Obtain sales from new customers
   d. Would you like assistance in creating your promotion?
3. Provide some targeting parameters:
   a. Geographical:
      (i) Region
      (ii) City
      (iii) Draw your own borders
      (iv) Within X miles of your address
   b. Check the business types that may buy from you
   c. Include people from previous promotions?
   d. Would you like to target customers who spend (include spend bands)
   e. Would you like to target customers who are similar in characteristics to your existing customers?
4. How would you like your promotion to appear?
   a. Statement credit
   b. Coupon
   c. Point of Service (POS)
   d. Email
   e. Mobile
   f. Statement insert for bank
   g. Visa or bank promotion site 5. When would you like your promotion to first appear?
6. What is the promotion period for your promotion?
7. What type of reporting do you require?
8. Pricing
   a. What is your budget? (the merchant 110 enters budget and system provides approximate number of cardholders addressed based upon parameters selected)
   b. Enter # of cardholders desired (system calculates pricing based upon parameters selected)

The other collaborative constituents may negotiate with the collaborative constituent that submitted the proposal until the parameters of the loyalty program 114 are agreed upon among the collaborative constituents. For example, the collaborative constituent that submitted the proposal may receive a response thereto indicating that the parameter for the loyalty program 114 is not agreed upon. Consequently, the collaborative constituent that submitted the proposal may transmit a reply to the response including an alternative parameter for the loyalty program 114. The negotiation can continue until the collaborative constituents have agreed on the remaining set of parameters for the loyalty program.

Thereafter, a loyalty program implementer, such as one of the collaborative constituents that agreed on a set of parameters for the loyalty program 114, may implement the loyalty program 114. For example, as one of the loyalty program implementers, the issuer 104 may disseminate a Nordstrom® credit card account number associated with the loyalty program 114 to the consumer 102. Dissemination modes may include direct mail, email, cellular phone transmissions, and/or messages sent to the consumer 102 via the merchant's 110 POS device (e.g., a message printed on the receipt).

When the consumer 102 uses the Nordstrom® credit card account number at the merchant's 110 POS terminal to purchase a good or service such as a pair of socks, a transaction message can be sent from the merchant 110 POS to the acquirer 108. The transaction message may include fields populated with transaction data for the purchase such as the date, the time, a merchant unique identifier, a promotion code, a Stock Keeping Unit (SKU), a Universal Product Code (UPC), manufacturing codes, geographical distribution codes, or sale, license, or hire value such as an item price. The acquirer 108 may send at least portions of the transaction data for the purchase to the transaction handler 106 that implements the loyalty program business rules (e.g., "ten (10%) percent off a purchase of socks if you use a Nordstrom® credit card") to the transaction data for the purchase to evaluate whether the transaction qualifies for the loyalty program 114 and what benefits the consumer 102 should receive if the consumer 102 qualifies. The benefit to the consumer 102 making the pair of sock purchase with the Nordstrom® credit card account number may be a statement credit on the consumer's 102 Nordstrom® credit card account equal to ten (10%) percent of the purchase price of the socks. The transaction handler 106, as one of the loyalty program implementers, may forward the result of the evaluation, the value of the benefit, or combinations thereof to the issuer 104, the merchant 110, or the consumer 102, for example. The platform 112 may provide several tools to facilitate the negotiation process of proposal, response, and reply.

At least a portion of the transaction data for a plurality of purchases, analysis on the transaction data for a plurality of purchases, or combinations thereof may be accessible to the collaborative constituents via the platform 112. For example, the transaction handler 106 may store in a database the transaction data for a plurality of the consumers 102 conducting transactions using a respective account within the transaction processing system associated with the consumer 102. The transaction handler may allow collaborative constituents access to a portion of the transaction data for a plurality of the consumers 102 stored in the database or a copy of a portion of the transaction data for a plurality of the consumers 102 stored elsewhere via the platform 112.

The transaction handler may analyze the transaction data for the plurality of the consumers 102 using an algorithm and allow access to the collaborative constituents to the analysis via the platform. For example, the algorithm's input may include a portion of the parameter for the loyalty program (e.g., the promotion, such as socks) and data on one or more purchases from one or more of the merchants by one or more of the consumers. The algorithm's output may include a quantitative trend within the purchases as a function of the parameter for the loyalty program or portions thereof. Any conventional or predetermined algorithm for data analysis may be used to determine trends within the data of purchases on the account. For example, data mining analysis such as Market Basket Analysis, a pattern recognition analysis, optimization analysis, statistical analysis, a data mining analysis, algorithm demographic analysis, classification analysis, or segmentation analysis can be used. To illustrate, the consumer 102 who has purchased lawn care items in April for the last four years might be identified as being highly likely to purchase lawn care items this April. In another example, general consumer trends may be analyzed to determine highly correlative events, such as "consumers who purchased a pair of shoes also buy a pair of socks within 90 days from the date of purchase of the pair of shoes." In another example, the consumer 102 purchase behavior trends may be analyzed to reveal the consumers 102 that spend significantly larger amounts in restaurants than average restaurant patrons.

The collaborative constituents may repeat the process of proposal, response, and optionally reply to refine or alter the remaining set of parameters of the loyalty program 114 based in part on the transaction data for a plurality of purchases, analysis on the transaction data for a plurality of purchases, or combinations thereof, for example.

The loyalty program 114 illustrated in FIG. 1 may be any number of loyalty programs 114 that may be created or maintained within the platform 112. Moreover, any single of the collaborative constituents may be involved in any number of the loyalty programs 114 accessible via the platform 112.

Figure 2:
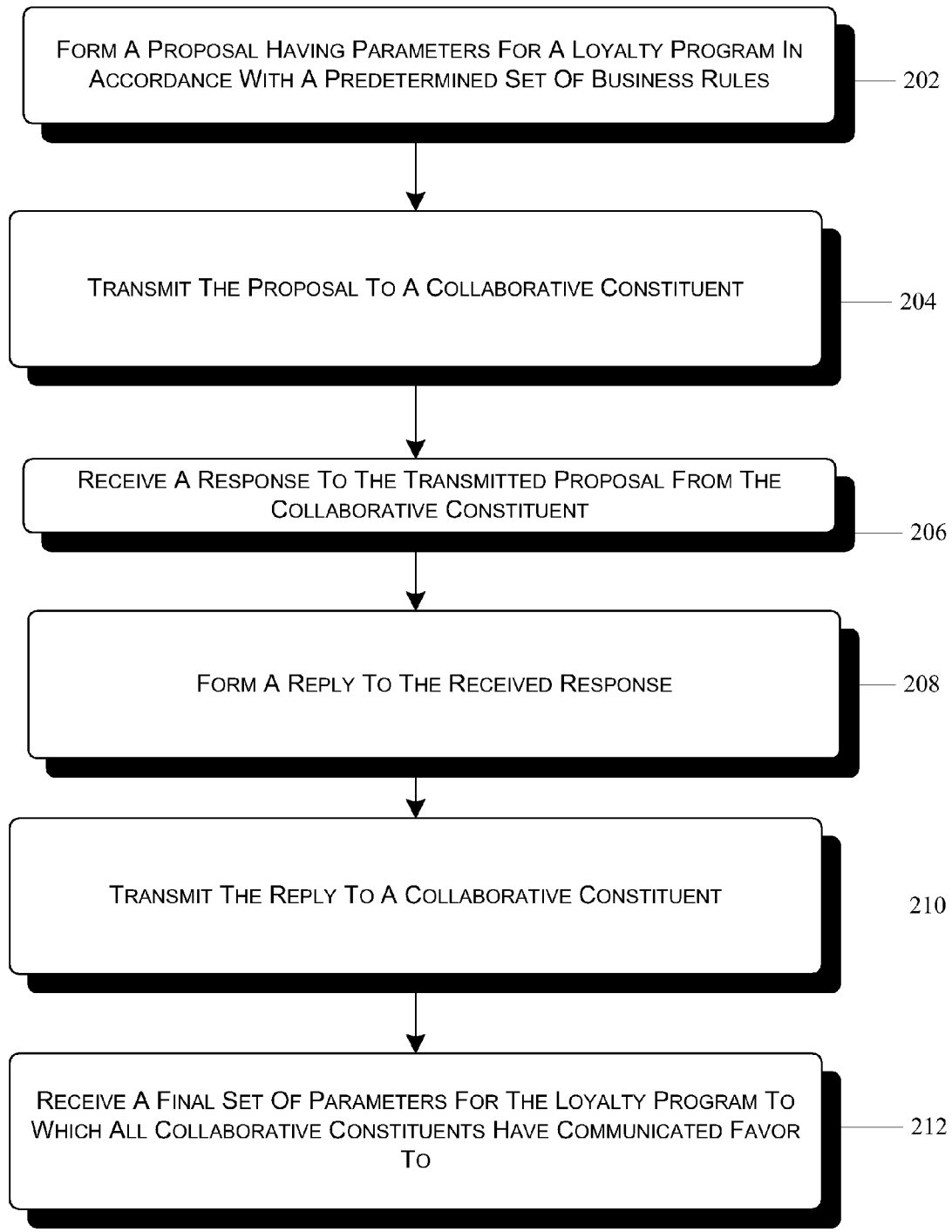
FIG. 2 illustrates a flow chart of an exemplary method for collaborating to develop, implement, and refine a loyalty program having at least one parameter.

Referring to FIG. 2, an implementation for a method 200 for collaborating to develop the loyalty program 114 begins at step 202. At step 202, a proposal having parameter(s) for the loyalty program 114 is formed. The parameters may include incentives that may be offered to the consumer 102, limits for the incentives such as a duration for the availability of the incentive, or the location where the incentive may be earned, or a specific time of day when the incentive is available. Parameters for the loyalty program 114 may be based on the merchant's current inventory, the merchant's projected future inventory, or the merchant's past inventory of a commodity such as a good or service. The parameters may also include the loyalty program business rule to determine whether a purchase qualifies for the promotion or incentive such as a spent-and-get promotion or a coupon promotion. For example, a coupon promotion may be structured such that if the consumer 102 uses an account associated with the transaction processing system to make a purchase at the merchant's 110 store that exceeds $100 U.S. in value, then 10% will be taken off the purchase value at the merchant's 110 POS device at the time of the purchase. Other loyalty program business rules may include ratios between the money or value spent and the promotion such as: a unit of value spent to a statement credit ratio (e.g., airline point spend to a credited U.S. dollar ratio); a unit of value spent to a redeemable point ratio; a unit of value spent to a redeemable money ratio; a unit of value spent to a redeemable discount ratio; a unit of money spent to a rebate ratio; a unit of value spent to a statement credit ratio; a unit of money spent to a good ratio; a unit of money spent to service ratio, and combinations thereof.

The proposal may be formed in accordance with a predetermined loyalty program rule. The predetermined loyalty program rule may include rules on the procedure to form and transmitting the proposal and/or rules on the content of the proposal for the loyalty program 114. The predetermined loyalty program rule for the procedure of forming and transmitting the proposal may include: the format of the proposal such as text based message formatting, the prerequisites for submitting a proposal such as identifying the entity making the proposal, or contractual obligations for transmitting a proposal such as an agreement to negotiate in good faith. The predetermined loyalty program rule for the content of the proposal may include rules delineating the types of parameters that can be proposed. For example, the predetermined business rule may require that the loyalty program 114 involve the use of the transaction processing system. To illustrate, the predetermined loyalty program rule may require that the proposal for the loyalty program 114 must reward the use of a particular brand of credit card. Similarly, the predetermined loyalty program rule may require that the transaction messages associated with a transaction be in a particular format, such as magnetic stripe format having fields that can be populated. For example, the predetermined loyalty program rule may include a rule for populating the transaction message with an identifier for the merchant 110 such as the GUID for the merchant 110, information on the transaction (e.g., a date or a time of the transaction, a transaction amount, or location), information on the reward (e.g., a value for the reward, an identifier for the reward), or an identifier for a commodity purchased during the transaction.

At step 204, the proposal is transmitted to a collaborative constituent. A transmission of the proposal can be formed that is addressed to at least one other collaborative constituent. A third party may transmit the proposal to the destined collaborative constituent. For example, the proposal can be addressed to the collaborative constituent via an email address. Alternatively, the address can be to a category of collaborative constituents such as "all issuers within the transaction processing system." The third party may then transmit the proposal to the collaborative constituent in accordance with a workflow identifying the order of deliver of the proposal addressed to the collaborative constituent(s). The workflow may identify a sequence of collaborative constituents that should receive the proposal such as in a series or parallel sequence. To illustrate, the merchant 110 may form a proposal for a spend-and-get loyalty program (e.g., buy two pairs of shoes get the third pair of shoes free). The merchant 110 may address the proposal to two collaborative constituent that are each issuers 104: Wells Fargo and Bank of America, via the transaction handler 106. The transaction handler 106 may receive the proposal and send the proposal to both Wells Fargo and Bank of America at the same time. The transaction handler 106 may analyze the proposal to make sure it comports with the predetermined loyalty program rule prior to transmitting the proposal to either Wells Fargo or Bank of America.

At step 206, a response from the collaborative constituent to the transmitted proposal is received. The response may be transmitted to the entity that formed the proposal and/or to another collaborative constituent via a workflow identifying a predefined order of delivery thereof. In the example above, Wells Fargo may wish to respond favorably to the merchant's 110 spend-and-get proposal. Consequently, Wells Fargo may respond by indicating that it will help create and implement the spend-and-get loyalty program for the consumers 102 that are account holders with Wells Fargo. Wells Fargo may also present a counter proposal in its reply stating that if spend-and-get loyalty program availability to the consumers 102 is limited to the months of March through May, Wells Fargo can credit the value of the third pair of shoes on the statement of the consumer 102 that is an account holder with Wells Fargo such that the consumer 102 can charge the purchase of the third pair of shoes at the merchant's 110 store but Wells Fargo will apply a credit for the value of the third pair of shoes to the consumer's 102 Wells Fargo® account. Consequently, the response can be used to further negotiate the parameters of the loyalty program 114 being proposed, for example, by containing a favor or disfavor of the at least one parameter for the loyalty program 114.

The response may contain further detail on how the loyalty program 114 can be implemented. For example, the issuer 104 may respond to the merchant's 110 proposal for the loyalty program 114 by indicating how the issuer 104 may market the loyalty program 114 to the issuer's 104 account holders such as: identifying the consumer 102; creating a marketing collateral for the loyalty program 114; delivering the marketing message to at least one of the consumers 102; registering a potential consumer for the loyalty program 114; or a combination of the foregoing.

At step 208, a reply to the response can be formed. The reply may also be in accordance with the predetermined loyalty program rule for the loyalty program 114. For example, the reply may state that the merchant 110 expresses favor to Wells Fargo's response to the spend-and-get loyalty program proposal further indicating that transaction messages from the merchant 110 for each purchase of the consumer 102 will include a code for the spend-and-get loyalty program so that Wells Fargo can distinguish the consumer 102 that has made a purchase toward the spend-and-get loyalty program at the merchant's 110 store. For example, the merchant 110 may populate a field within the transaction message with "SPGT" to distinguish transactions eligible for the spend-and-get loyalty program of the merchant 110. Alternatively, or in combination, the issuer may populate a field within the transaction message with free form text such as "authorized a third purchase for this customer toward Fry's® spend-and-get loyalty program."

At step 210, the reply is transmitted to at least one collaborative constituent. The reply may be transmitted to any collaborative constituent such as the collaborative constituent that sent the response. For example, the merchant 110 may transmit the reply of favor to Wells Fargo's response by sending the reply in a Short Message Service (SMS) to the transaction handler 106 that forwards the SMS to Wells Fargo. Alternatively, or in combination, the merchant 110 may address the reply to Bank of America inquiring if Bank of America is willing to make a better deal than that sent by Wells Fargo. Bank of America may transmit a Bank of America response including a set of parameters that the merchant 110 may find more favorable.

The workflow for the order of delivery of the proposal, response, or reply may be serial (e.g., sequential such that each addressed collaborative constituent receives the transmission consecutively), parallel (e.g., such that each addressed collaborative constituent receives the transmission concurrently) or a combination thereof. Moreover, the workflow for the proposal, response, or reply may be the same as each other or different from each other. The collaborative constituent can optionally specify the workflow for the order of delivery of each of the proposal, response, or reply.

The steps of 202 through 210 may be repeated until an agreement is reached. For examples, proposals, responses, and replies may contain offers, counteroffers, and acceptances from the collaborative constituents developing the parameters for the loyalty program 114. The repetition of the steps 202 through 210 may take several iterations and collaborative constituents may participate or stop participating at any step of 202 through 210.

The business case for parameters can be made during the negotiation process (e.g., steps 202 through 210). The collaborative constituents may evaluate the business case for the parameter of the loyalty program 114 and argue its effectiveness to the other collaborative constituents involved in the negation. For example, the business case may entail: determining a cost and a benefit for the parameter; determining a cost and a benefit for not having the parameter; determining a business need that the parameter may address; performing a gap analysis; determining a reason for the parameter; or determining a reasons for one of favoring and disfavoring the parameter.

The collaborative constituents may use analytical tools to determine the effectiveness of at least one parameter of the loyalty program 114 being negotiated. The analytical tools can include: a data mining tool; a reporting tool; a metrics tool; a demographics tool; an analytic tool; a targeting tool; a statistic tool; a segmentation analysis tool; a tool for determining at least a cost and a benefit for the parameter; a tool for determining at least a cost and a benefit for not having the parameter; a tool for determining the business need that the parameter will address; a tool for gap analysis; a tool for determining a reason for the parameter; a tool for determining the reasons for at least one of favoring and disfavoring the parameter; or a combination of the foregoing.

The transaction handler 106 may provide the other collaborative constituents, via the platform 112, data mining tools and access to a plurality of the consumer's 102 transaction data during the negotiation process. For example, the merchant 110, such as a hardware store, may want to know the transaction history of a plurality of the consumers 102 living within 10 miles of the merchant 110 hardware store—specifically, the transaction history of purchases of florescent lights. The transaction handler 106 may have access to a database containing the transaction history of a plurality of the consumers 102 across a plurality of the merchants 110 within the transaction processing system. The transaction handler 106 may allow the merchant 110 access to an analytical tool, such as a data mining tool, to filter out the florescent light transaction history of the consumers 102 within ten miles of the merchant's 110 hardware store. The outcome of the analytical tool may indicate that only twenty florescent light purchases have been made within the last month within the ten mile radius of the merchant's 110 hardware store. The merchant 110 may determine that a loyalty program centered on florescent lights may not be feasible for the merchant 110. Consequently, the merchant 110 may transmit a reply indicating that the merchant 110 will no longer participate in the negotiation of the loyalty program 114 that is centered around florescent lights.

At step 212, a negotiated set of parameters to which all remaining collaborative constituents have communicated favor to the negotiated set of parameters is received, the negotiated set of parameters being the remaining parameters for the loyalty program 114. The negotiated set of parameters can be the minimum parameters that the collaborative constituents need to agree on in order to implement the loyalty program 114. The negotiated set of parameters need not have all of the details to implement the loyalty program 114. For example, the address for the location for all the merchants 110 that will participate in the loyalty program 114 need not be settled. The negotiated set of the parameters for the loyalty program 114 may be received from at least one implementer of the loyalty program 114.

The remaining collaborative constituents need not communicate favor to each and every parameter in the negotiated set of parameters; rather, the remaining collaborative constituents can communicate favor to the negotiated set of the parameters. The remaining collaborative constitutes can be those that have not expressed a desire to exit the negotiation process or those that have not contributed to the negotiation process for a period of time (e.g., days or months), such that their lack contribution indicates a desire to exit the negotiation process.

The communicated favor for the negotiated set of parameters forms a negotiated agreement to the negotiated set of parameters that can be communicated to each of the collaborative constituents that remained in the collaboration and agreed to the negotiated set of the parameters. For example, the I transaction handler 106 may transmit the negotiated set of the parameters for the loyalty program 114 to the remaining set of the collaborative constituents. The transaction handler 106 may determine which of the remaining parameters for the loyalty program 114 the remaining set of collaborative constituents have agreed upon as being the negotiated set of the parameters for the loyalty program 114. The transaction handler 106 may address a second transmission to each of the collaborative constituents among the remaining set of the collaborative constituents including the negotiated set of the parameters for the loyalty program.

To illustrate, the merchant 110 may be a coffee shop wishing to create and implement a coffee shop loyalty program for its patrons. The coffee shop owner may form a coffee promotion proposal using an interactive interface on a network in communication with the transaction processing system, the promotion proposal including a parameter indicating that the coffee shop loyalty program should have a spend-and-get promotion wherein patrons can purchase ten cups of coffee and receive the eleventh one free.

The coffee shop owner may use an interface device connected to the system 100 for collaborating to develop, implement, and refine a loyalty program, such as a cellular telephone with an Internet connection, to log on to the transaction handler's 106 website and input the proposed spend-and-get promotion parameters using the platform 112. Other forms of interface include: a personal computer, a personal digital assistant, a hand-held computing device, a mobile computing device having telephony functionality, a cellular telephone, a mobile consumer device, and a combination of the foregoing. The coffee shop owner may transmit the coffee promotion proposal to the issuer 104, a Wells Fargo® bank, via the transaction handler 106 such that the transaction handler 106 receives a first transmission from the coffee shop owner and the transaction handler 106 send another transmission including at least a portion of the first transmission to the Wells Fargo® bank.

The Wells Fargo® bank can transmit a response indicating favor to the coffee promotion proposal further indicating that the coffee shop loyalty program should be marketed to patrons living within 10 minutes from the coffee shop. The coffee shop owner may agree, submitting a reply to the response expressing favor to the 10-minute limitation not having discussed if the 10 minutes is calculated based on using surface streets or the subway. The transaction handler 106 may determine that the coffee shop owner and Wells Fargo® bank have agree that the spend-and-get promotion and the 10-minute limitation are the parameters for the coffee shop loyalty program thereby forming the negotiated agreement for the coffee shop loyalty program even without knowing if the 10-minute limitation is calculated based on using surface streets or the subway. The transaction handler 106 may determine that both the coffee shop owner and Wells Fargo® bank have agree to the remaining parameters for the coffee shop loyalty program by polling the number of favor positions received from each of the coffee shop owner and Wells Fargo® bank for each of the remaining parameters for the coffee shop loyalty program.

Moreover, parameters that do not comply with a predetermined loyalty program rule may be filtered out and not included in the remaining parameter for the coffee shop loyalty program. For example, if the coffee shop owner may have proposed a parameter for the coffee shop loyalty program stating that cash purchases count toward the coffee shop loyalty program; however, one of the predetermined loyalty program rules may indicate that only credit purchases may apply toward loyalty programs developed through the use of the platform 112.

The negotiated agreement for the coffee shop loyalty program, including the negotiated set of parameters, can be communicated back to both the coffee shop owner and the Wells Fargo® bank in a transmission using the workflow or another workflow identifying another predefined order of delivery.

After the negotiated agreement is communicated to each of remaining set of the collaborative constituents, which may include one of the loyalty program implementers, the loyalty program 114 may be refined or altered. The alteration may include renegotiating a parameter within the negotiated set of parameters or negotiating a new parameter. The refinement may occur before or after the loyalty program 114 has been implemented as long as the remaining collaborative constituents agree that the negotiated set of parameters can be further negotiated. For example, one of the collaborative constituents within the remaining set of the collaborative constituents may address a transmission to the transaction handler 106 requesting to alter the at least one remaining said parameter for the loyalty program. The request may include an affirmative representation that each of the collaborative constituents in the remaining set of the collaborative constituents have each agreed to the request to alter. Alternatively, or in combination, the transaction handler 106, for example, can determine that each of the collaborative constituents in the remaining set of the collaborative constituents have each agreed to the request to alter, such as by taking a pole through electronic communication with each of the collaborative constituents among the remaining set of the collaborative constituents.

The steps to alter the remaining parameters for the loyalty program may include similar steps as the negotiation process (e.g., steps 202 through 212): a refinement proposal in accordance with the predetermined loyalty program rule can be formed and transmitted to an addressed collaborative constituent; a refinement response from the addressed collaborative constituent can be received, wherein the response is to the transmitted refinement proposal; a refinement reply to the received refinement response in accordance with the predetermined loyalty program rules may be formed and transmitted; a second negotiated set of parameters to which all remaining collaborative constituents have communicated favor to the second negotiated set of parameters can be received, the second negotiated set of parameters being the parameters for the loyalty program 114 that has been refined; and a second negotiated agreement to the second negotiated set can be communicated to each of the of collaborative constituents among a second remaining set of the collaborative constituents.

For example, the coffee shop owner may use the analytical tools available at the platform 112 to evaluate the performance of the spend-and-get coffee shop loyalty program after it has been implemented for six months. The analytical tool may isolate all purchases of coffee at the merchant's 110 store for the past six months across all of the consumers 102 that made a purchase at the merchant's 110 store. The coffee shop owner may determine that sales volume for coffee has not increased at his coffee shop store in the past six months that the spend-and-get coffee shop loyalty program has been implemented. The analysis may provide a comparison of sales volume of the coffee shop of the coffee shop owner against other coffee shops in the area. Given the outcome of the analysis, the coffee shop owner may determine that the spend-and-get coffee shop loyalty program is not cost effective and should be terminated. Alternatively, or in combination, the coffee shop owner may request that an analysis be done showing sales volume of all spend-and-get loyalty programs involving coffee across a plurality of the merchants 110 within a fifteen mile radius. Thereafter, the coffee shop owner may decide to alter one of the parameter of the spend-and-get coffee shop loyalty program such as by requiring only five purchases of coffee prior to receiving the sixth one free.

A computer program product can be configured to enable a computer to facilitate the loyalty program 114. Software instructions for enabling the computer to perform predetermined operations facilitating construction, marketing, loyalty program qualification, fulfillment, and refinement of the loyalty program 114 can be accessible from a computer readable medium bearing the software instructions for the methods beginning at step 202. For example, the transaction handler 106 may maintain the computer such as by controlling access to the platform 112, hosting the computer, or controlling the flow of transmissions.

Figure 3:
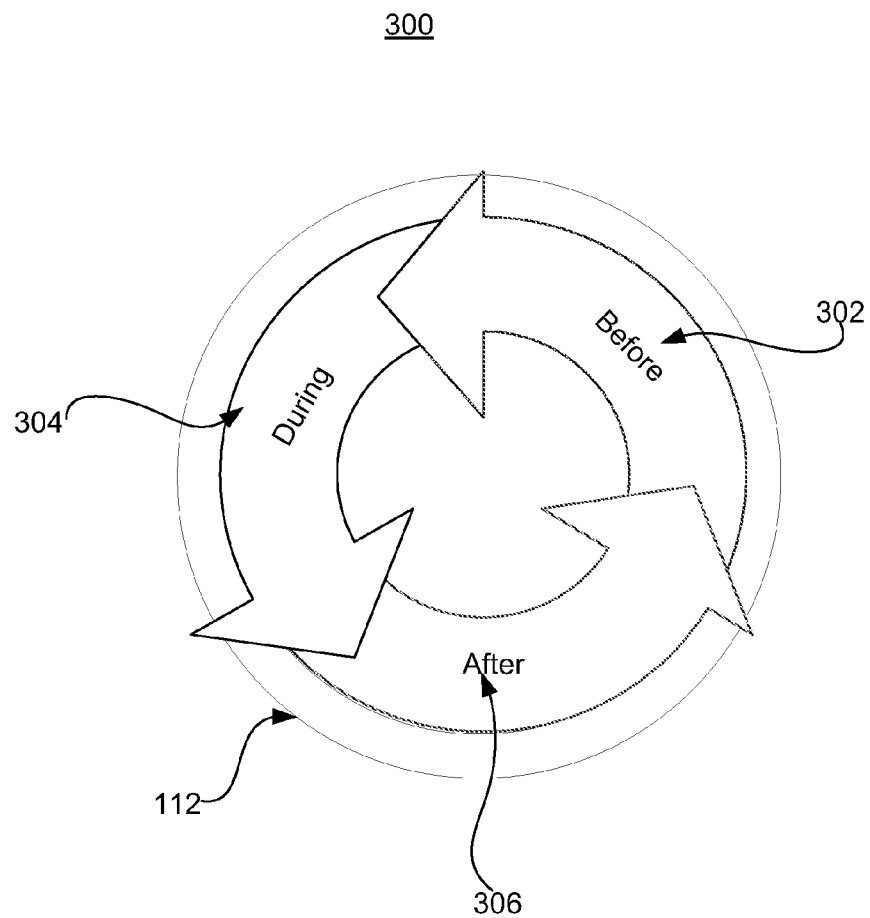
FIG. 3 is a schematic of an exemplary transaction lifecycle the phases of which can be facilitated within the environment of the system illustrated in FIG. 1.

FIG. 3 is a schematic of a transaction lifecycle 300 for the loyalty program 114 including the phases of a Before Phase 302, a During Phase 304, and an After Phase 306. In one embodiment, the platform 112 supports the loyalty program 114 throughout the transaction lifecycle 300.

At the Before Phase 302, the loyalty program 114 may be created using the platform 112. For example, potential consumer information may be analyzed at the Before Phase 302 including obtaining one or more transaction files of corresponding potential consumers, transforming the files into readable form, and segmenting and identifying the potential consumer of the loyalty program 114. Moreover, negotiations can occur with collaborative constituents, such as the issuer 104 or the merchant 110 to construct loyalty program business rules in order to determine what transactions may qualify for the loyalty program 114.

At the During Phase 304, the platform 112 can facilitate information exchange. For example, information in a transaction message associated with a transaction may be relayed to a participant of the loyalty program 114 such as the transaction handler 106 that in turn relays the information in the transaction message to the other participant of the loyalty program 114 via the platform 112. Moreover, the information in the transaction message may be analyzed such as by qualifying and authenticating non-financial data (e.g., authenticating the GUID for the merchant 110).

At the After Phase 306, the platform 112 can facilitate the refinement of the loyalty program 114. For example, the loyalty program 114 can be refined to better meet the needs and intended goals of the participants by evaluating the transaction data of a plurality of the consumers 102 that have participated in the loyalty program 114.

The actions described for each of the Before Phase 302, the During Phase 304, or the After Phase 306, are not limited to a particular phase alone. For example, construction of the loyalty program 114, construction of loyalty program business rules, analysis of information, and negotiation between collaborative constituents, can occur at the Before Phase 302, the During Phase 304, and/or the After Phase 306. For example, at the After Phase 306, a new parameter of the loyalty program 114 can be created. Similarly, actions such as facilitating the exchange of transaction data and analysis of the transaction message can occur at the Before Phase 302, the During Phase 304, and/or the After Phase 306. For example, at the After Phase 306, the information in the transaction message may be analyzed. Moreover, actions such as further qualifying the transaction message, refining the loyalty program 114 and fulfillment calculation and realization can occur at the Before Phase 302, the During Phase 304, and/or the After Phase 306. For example, at the Before Phase 302, the loyalty program 114 may be further refined and the qualifying fulfillment for the loyalty program 114 may occur at the During Phase 304 (e.g., discount at the POS).

Figure 4:
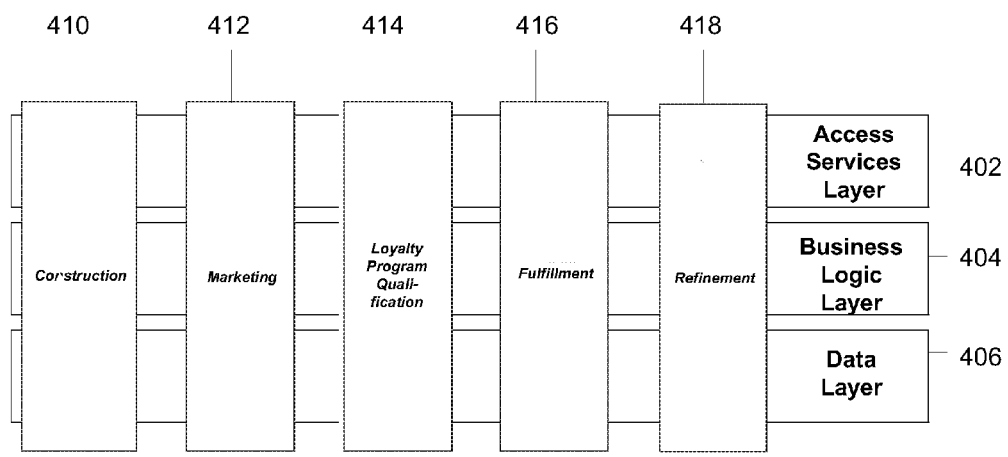
FIG. 4 is a schematic illustrating an exemplary platform and components of a loyalty program.

FIG. 4 is a schematic illustrating various layers of the platform 112 that the collaborative constituent may have access to and the components of the loyalty program 114 that the platform 112 can facilitate.

Several layers can support the platform 112 including an access services layer 402, a business logic layer 404, and a data layer 406. The access services layer 402 of the platform 112 represents the common data interface between collaborative constituents. Via the access services layer 402, collaborative constituents can communicate with one another in a market place type environment. For example, each collaborative constituent may transmit proposals, responses, and/or replies under a predetermined loyalty program rules.

The business logic layer 404 is the infrastructure within the platform 112 that supports collaboration between collaborative constituents. For example, the business logic layer 404 may include a server, a database, and a program that can determine whether the consumer's 102 transaction for the purchase of a hammer qualifies for the merchant's 110 loyalty program involving hand carpentry tools.

The data layer 406 represents transaction and participant data, such as (but not limited to) card holder names, addresses, communication preferences and history, that may be available to the collaborative constituent at the platform 112. The transaction data come from various sources including: information from the consumer 102, information from the issuer 104, information from the acquirer 108, information from the transaction handler 106, or information from the merchant 110, or information from a third party, such as demographics. The information from the consumer 102 may include: the consumer's 102 identification such as name or address, the consumer's 102 account identification such as account number, the consumer's 102 inputted data such as preference for particular incentives, or the consumer's 102 shopping trends. The information from the issuer 104 may include: the issuer's 104 unique identifier, the issuer's 104 address, the issuer's 104 business rules, the issuer's 104 fulfillment options, accumulated information about the consumer 102 for a period of time (e.g., types of credit cards the consumer 102 has owned over the past two years), and information on third parties that act as proxies to the issuer 104. The information from the acquirer 108 may include: the acquirer's 108 unique identifier, the acquirer's 108 address, the GUID for the merchant 110, or accumulated daily sale report of the merchant 110. The information from the transaction handler 106 may include: transaction message field formatting requirements, credit card spending limits, credit history, or demographic analyses. Information from the merchant 110 may include: the GUID for the merchant 110, the merchant's 110 acquirer code, franchise codes, or the merchant's 110 business rules codes. The information from third parties could include such information as household income, marriage status, number of children, homeowner status, and years in home.

The transaction data may also includes different types of information including: a transaction message; product or service information such product or service type, SKU number, chain of distribution, manufacturing codes, and geographical distribution codes; sale, license, or hire value information such as an item price; loyalty program business rule; loyalty program incentive information such as points, conditions for receiving double points, rewards, or cash back; an offer, negotiation, or a posting transaction cost information such as cost of processing a token transaction.

The collaborative constituents can access the platform 112 to facilitate various components of the loyalty program 114 including: a construction 410, a marketing 412, a loyalty program qualification 414, a fulfillment 416, and a refinement 418 components of the loyalty program 114.

The collaborative constituents may access the platform 112 for the construction 410 component of the loyalty program 114. Through the access services layer 402, two or more of the collaborative constituents can interact to construct the loyalty program 114. The construction 410 of the loyalty program 114 can include: constructing the business case that supports a parameter of the loyalty program 114, posting proposals, negotiating proposals, or identifying potential participants. For example, the collaborative constituent may choose from predetermined parameters developed by the transaction handler 106 prior to the negotiation in constructing the loyalty program 114, negotiating them in isolation or combinations. The collaborative constituent, such as the merchant 110, may transmit proposal containing a parameter that the merchant 110 wishes another of the collaborative constituents to accept (e.g., express favor to), identify the consumer 102 such as a consumer group desired to become a recipient of the proposal, or elect to receive information from the data layer 406 regarding the consumer 102.

Through the use of the data layer 406, collaborative constituents can construct the loyalty program 114 targeting the consumer 102 and the product purchased. For example, the loyalty program 114 can be a loyalty program that utilizes high level product information (e.g., a SKU) as a trigger for the loyalty program business rule. The trigger can be product category specific "music players," or product line specific such as iPod® Nano, or a manufacturer such as Apple Computer, Inc. (e.g. "ten percent off all Apple Computer® products if you use your Wells Fargo® credit card."). Consequently, the collaborative constituent involved in different levels of the chain of distribution such as a manufacturer, a distributor, a retailer, or the merchant 110, can better target the loyalty program 114 promotion via the platform 112.

Moreover, the collaborative constituent, such as the issuer 104, can manage its participation in the loyalty program 114 such as during the construction 410 component of the loyalty program 114 and through the access services layer 402. The managing participation in the loyalty program 114 can include: choosing marketing initiatives; registering the issuer's 104 rewards programs, ensuring that the issuer 104 qualifies for certain interchange levels, choosing specific promotions for the consumer 102 to receive or participate in;

selecting a method by which proposal messages can be delivered; finding the merchant 110 partners for proposals the issuer 104 would like to run; posting information about proposals the issuer 104 would like to run for the consumer 102 such as what type of cardholder qualifies for the loyalty program 114 or how many cardholders can qualify; obtaining the consumer's 102 transaction data; or choosing proposal parameters.

The collaborative constituents may access the platform 112 for the marketing 412 component of the loyalty program 114. The marketing may include sending a marketing transmission containing information based in part on the remaining parameter for the loyalty program 114 (e.g., buy three hamburgers from Hamburger Co. and get the fourth free), wherein the third transmission is addressed to at least one of the consumers 102. For example, the transaction handler 106 can assist a collaborative constituent in the creative development of a marketing strategy, such as creating the marketing collateral, registering a participant of the loyalty program 114 such as the consumer 102, or delivering a marketing message to the consumer 102 via a number of channels such as email direct mail, email, text messaging, media advertising, pop up advertising, telemarketing, or point of sale communication. The registering of the participant of the loyalty program 114 can include registering collaborative constituents for the loyalty program 114 or registering entities that are not one of the collaborative constituents. For example, the consumer 102 may send a transmission indicating that the consumer 102 wishes to have an account that is rewarded based on the parameters on the loyalty program 114 the consumer 102 received in the marketing transmission.

The collaborative constituent may access the platform 112 for the loyalty program qualification 414 component of the loyalty program 114. The loyalty program business rules may be applied to the transaction data associated with the consumer's 102 purchase to determine if the purchase qualifies for the reward associated with the loyalty program 114. The transaction data may include data that populate a field within the transaction message associated with the transaction such as the merchant unique identifier, the consumer's 102 account number within the transaction processing system, and information about the product or service purchased, a code for the loyalty program 114, for example.

The fulfillment 416 component may entail changing the cost of an amount that is made payable on an account involved in the transaction based on a value of the incentive for the loyalty program 114 or providing value to the consumer associated with the account involved in the transaction, such as a free cup of coffee.

The collaborative constituent may access the platform 112 for the fulfillment 416 component of the loyalty program 114. For example, once a transaction, or set of transactions qualify for fulfillment of the loyalty program 114, the transaction handler 106 can facilitate fulfillment of that reward in accordance with one of the remaining parameter for the loyalty program 114. For example, if the loyalty program 114 is the coffee shop spend-and-get loyally program, the transactions that qualify for the coffee shop spend-and-get loyally program can be electronically tracked and a message sent to a cell phone of the consumer 102 that the consumer 102 can receive a free cup of coffee the next time the consumer 102 goes to the coffee shop owner's store. The transaction handler 106 may taking fulfillment actions including: calculate a the value of a promotion; awarding bonus points or miles; facilitating providing a statement credit, cash back value, or discount value to the participant of the loyalty program (e.g., the consumer 102); forwarding the part of the transaction data regarding the fulfillment (e.g., the calculated value of the promotion) to another of the collaborative constituent or to a support group such as a third party having a contractual obligation with the collaborative constituent. The fulfillment actions can occur in real time, as part of the clearing and settlement process, or sometime thereafter, for example.

The collaborative constituents may access the platform 112 for the refinement 418 component of the loyalty program 114. The collaborative constituent, can access tools available at the platform 112 such as reporting, metrics and analytical tools, enabling the collaborative constituent to get statically generated analysis, dynamically generated analysis, or review forward looking promotional calendars to refine the collaborative constituent's marketing strategies. For example, the merchant 110 may access the platform 112 to evaluate the loyalty program's 114 performance. The merchant 110 may create reports via statistical software accessible at the platform 112 and determine the degree that the consumer 102 or any group of the consumers 102 that are targeted as participated in the loyalty program 114 have changed the consumer's 102 purchasing behavior based on parameters including: demographics, SKU numbers, store locations, seasonal variances, or consumer habits of buying related commodities such as shoes and socks. The merchant 110 may decide to refine the merchant's 110 range of the consumers 102 that are targeted or promotions in the loyalty program 114 by continuing the negotiation process, such as steps 201 through 210 of FIG. 2.

Although illustrated in a progressive manner, the transaction components of the following can follow any order or be concurrent: the construction 410, the marketing 412, the loyalty program qualification 414, the fulfillment 416, and the refinement 418 components. For example, the refinement 418 component of the loyalty program 114 may occur during the marketing 412 component such as by narrowing the group of the consumers 102 that are targeted, the fulfillment 416 component may occur during the transaction component program qualification 314 component such as when the consumer 102 receives a discount during a purchase, and the marketing 412 can occur during the fulfillment 416 component such as providing the consumer 102 with a coupon for the next purchase. Other combinations are readily conceivable to a person of ordinary skill in the art.

Figure 5:
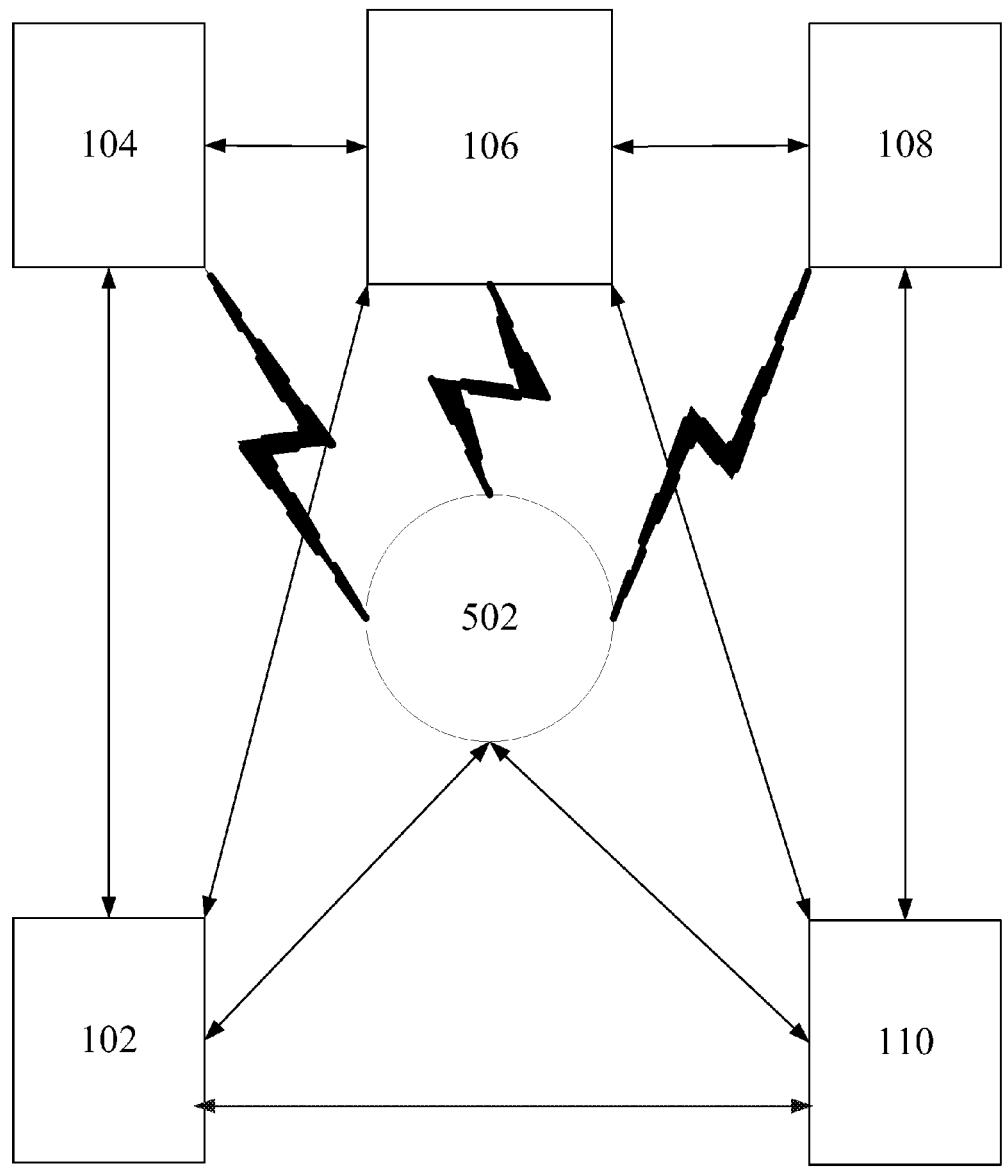
FIG. 5 is a block level diagram illustrating an exemplary transaction processing system that can be part of the system illustrated in FIG. 1.

As background information for the foregoing description, as will be readily understood by persons of ordinary skill in the art, a transaction such as a payment transaction, can include participation from different entities that are a component of a transaction processing system. An exemplary such transaction processing system such as a transaction processing environment is depicted in FIG. 5 as a payment processing system 500. The payment processing system 500 includes the issuer 104, the transaction handler 106, such as a credit card company, the acquirer 108, the merchant 110, or the consumer 102. The acquirer 108 and the issuer 104 can communicate through the transaction handler 106. The merchant 110 may utilize at least one POS terminal that can communicate with the acquirer 108, the transaction handler 106, or the issuer 104. Thus, the POS terminal is in operative communication with the payment processing system 500.

Typically, a transaction begins with the consumer 102 presenting a portable consumer device 502 to the merchant 110 to initiate an exchange for a good or service. The portable consumer device 502 may include a payment card, a gift card, a smartcard, a smart media, a payroll card, a health care card, a wrist band, a machine readable medium containing account information, a keychain device such as the SPEEDPASS® commercially available from ExxonMobil Corporation or a supermarket discount card, a cellular phone, personal digital assistant, a pager, a security card, an access card, a wireless terminal, or a transponder. The portable consumer device 502 may include a volatile or non-volatile memory to store information such as the account number or an account holder's name.

The merchant 110 may use an acceptance point device, such as a POS terminal, to obtain account information, such as an account number, from the portable consumer device 502. The portable consumer device 502 may interface with the POS terminal using a mechanism including any suitable electrical, magnetic, or optical interfacing system such as a contactless system using radio frequency or magnetic field recognition system or contact system such as a magnetic stripe reader. The POS terminal sends a transaction authorization request to the issuer 104 of the portable consumer device 502. Alternatively, or in combination, the portable consumer device 502 may communicate with the issuer 104, the transaction handler 106, or the acquirer 108.

The issuer 104 may authorize the transaction using the transaction handler 106. The transaction handler 106 may also clear the transaction. Authorization includes the issuer 104, or the transaction handler 106 on behalf of the issuer 104, authorizing the transaction in connection with the issuer's 104 instructions such as through the use of business rules. The business rules could include instructions or guidelines from the transaction handler 106, the consumer 102, the merchant 110, the acquirer 108, the issuer 104, a financial institution, or combinations thereof. The transaction handler 106 may maintain a log or history of authorized transactions. Once approved, the merchant 110 can record the authorization, and allow the consumer 102 to receive the good or service.

The merchant 110 may, at discrete periods, such as the end of the day, submit a list of authorized transactions to the acquirer 108 or other components of the payment processing system 500. The transaction handler 106 may compare the submitted authorized transaction list with its own log of authorized transactions. If a match is found, the transaction handler 106 may route authorization transaction amount requests from the corresponding acquirer 108 to the corresponding issuer 104 involved in each transaction. Once the acquirer 108 receives the payment of the authorized transaction amount from the issuer 104, it can forward the payment to the merchant 110 less any transaction costs, such as fees. If the transaction involves a debit or pre-paid card, the acquirer 108 may choose not to wait for the initial payment prior to paying the merchant 110.

There may be intermittent steps in the foregoing process, some of which may occur simultaneously. For example, the acquirer 108 can initiate the clearing and settling process, which can result in payment to the acquirer 108 for the amount of the transaction. The acquirer 108 may request from the transaction handler 106 that the transaction be cleared and settled. Clearing includes the exchange of financial information between the issuer 104 and the acquirer 108 and settlement includes the exchange of funds. The transaction handler 106 can provide services in connection with settlement of the transaction. The settlement of a transaction includes depositing an amount of the transaction settlement from a settlement house, such as a settlement bank, which the transaction handler 106 typically chooses, into a clearinghouse, such as a clearing bank, that the acquirer 108 typically chooses. The issuer 104 deposits the same from a clearinghouse, such as a clearing bank, which the issuer 104 typically chooses into the settlement house. Thus, a typical transaction involves various entities to request, authorize, and fulfill processing the transaction.

Global unique identifiers, such as GUIDs for the participants of the loyalty program 114, can promote uniformity in the exchange of information amongst the participant of the loyalty program 114 and facilitate the determination of whether a transaction between the consumer 102 and the merchant 110 qualifies for an incentive of the loyalty program 114. The GUID for the merchant 110 may take the form of a random code; an indicator of a franchiser for one or more of the merchants 110; an indicator of a franchisee store number for the merchant 110; an indicator of a corporate entity associated with the merchant 110; an indicator of a merchant category into which the merchant 110 is classified; or a combination thereof. The GUID for the merchant 110 may contain information that can categorize the merchant 110 into a merchant category, such as a retail store, having a corresponding merchant code such as "RSTR598183" the first four letters indicating that the merchant is categorized as a Retail SToRe=RSTR.

The GUID for the merchant 110 can distinguish the merchant 110 from other merchants within the transaction processing system. For example, an acquirer X may identify a Neiman Marcus® store number 99 by "9999" while another acquirer Y may identify a Safeway® located at 99th Avenue with "9999." Because "9999" is not unique within the payment processing system, a purchase at Safeway can not be distinguished from a purchase at Neiman Marcus. On the other hand, if each of the merchants 110 have a unique number within the payment processing system, purchases at each of the merchants 110 can be distinguished from one another.

In another example, "HD hardware store" may be a franchisor that has a HD hardware store loyalty program in connection with the issuer 104 developed using the platform 112. HD hardware store may have two franchisee merchants "HD hardware store X" and "HD hardware store Y" each having different acquirers: Acquirer X and Acquirer Y. Acquirer X may keep an internal log on franchisee merchant HD hardware store X with an identifier "9999." Acquirer Y may keep a separate internal log on HD hardware store Y with an identifier "WQ83." The issuer 104 involved in the HD hardware store loyalty program may not be able to recognize that hardware store X and hardware store Y have the same franchisor via the internal identifiers of acquirer X "9999" or acquirer Y "WQ83" respectively; consequently, the issuer 104 may have difficulty determining if a purchase at each store would qualify for the HD hardware store loyalty program. On the other hand, if HD hardware store's franchisee's are each assigned merchant unique identifiers, the issuer 104 may be able to better distinguish HD hardware store X or HD hardware store Y as participants of the HD hardware store loyalty program.

Other transaction data that may also be taken into consideration when determining whether a transaction qualifies for the incentive of the loyalty program 114 include: SKU numbers, UPCs, a timestamp for the transaction, an account GUID (e.g., an account number for an account within the payment processing system associated with the consumer 102), a code identifying the consumer 102 as a valued customer, or a code identifying a purchase qualifying for a loyalty program incentive. The collaborative constituent, such as the transaction handler 106, can transform the high level product or service information within the transaction message into a form usable to the collaborative constituent. For example, the SKU number can be subsequently transformed into banking industry file formats, validated, matched to corresponding financial records and delivered to the participant of the loyalty program 114 via a number of different channels.

Figure 6:
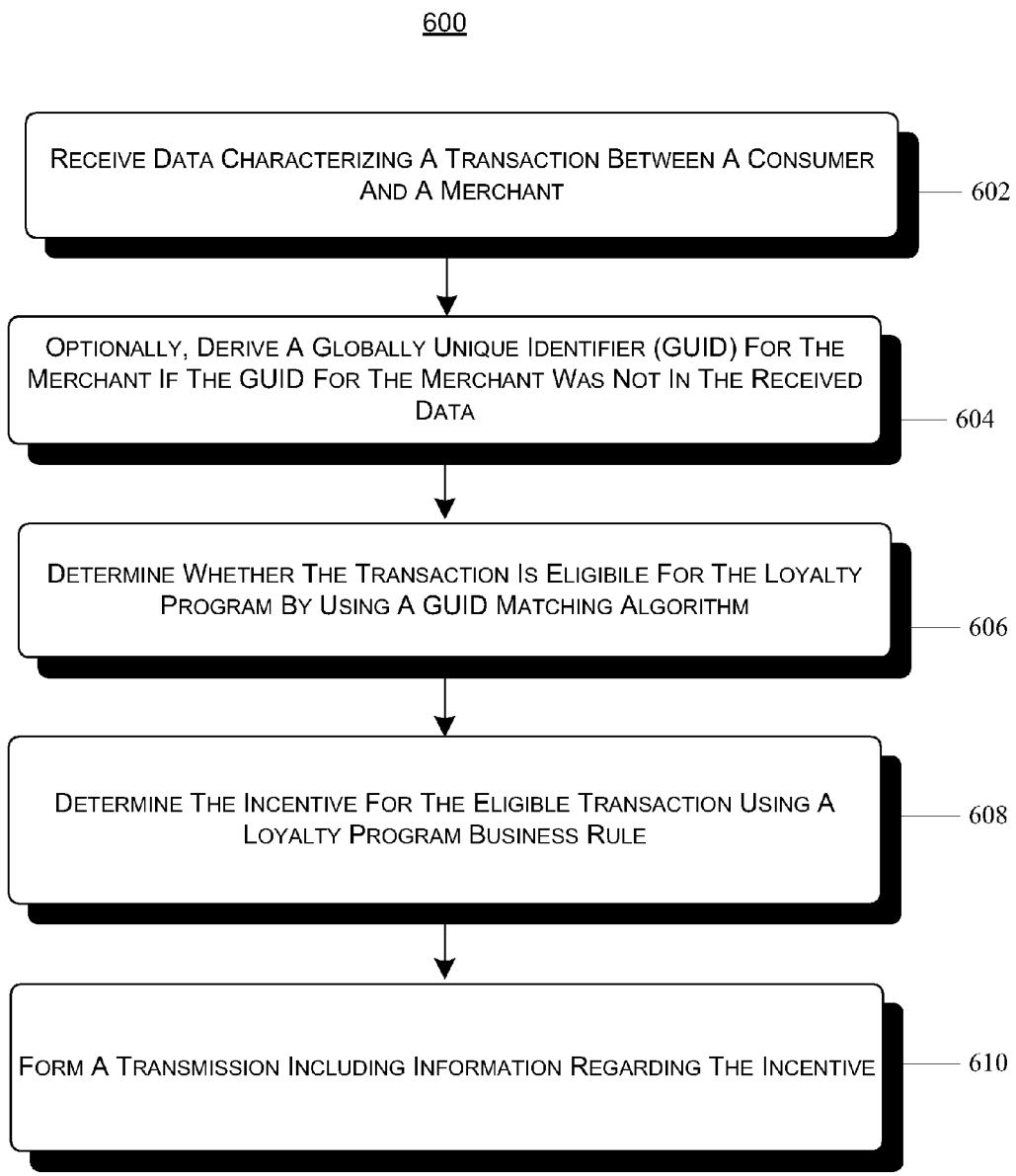
FIG. 6 illustrates a flow chart of an exemplary method for utilizing a globally unique identifier for a merchant to determine an incentive for the loyalty program.

Referring to FIG. 6, an exemplary method 600 for determining if a transaction between the consumer 102 and the merchant 110 qualifies for the incentive of the loyalty program 114 begins at step 602. At step 602, data characterizing the transaction is received, for example, by one of the loyalty program implementers receiving a notice containing the data characterizing transaction from the acquirer 108. The data characterizing the transaction may be received in a transmission at a computer, an electrical device having circuitry to receive electrical signals, or a radio frequency receiving device, for example. The transmission may be sent via a computer network, a wireless network, an electrical communication line, or a combination thereof.

The data characterizing the transaction can include the date of the transaction; the time of the transaction; an identifier for an account such as the account number of the consumer's 102 account used in the transaction; a code for the merchant 110 such as the GUID for the merchant 110 ("merchant GUID"); a code for the commodity traded in the transaction, such a GUID for the commodity ("commodity GUID"), SKU or a UPC of a good or service; or a combination of the foregoing.

The code for the merchant 110 may be nonunique. For example, the merchant 110 may have multiple codes associated with it such as when two acquirers 108 each have a different indicator for the merchant 110. Alternatively, or in combination, the code for the merchant 110 may be nonunique because a single indicator may be associated with multiple merchants 110 such as when the acquirer 108 has the indicator "XYZ" for a particular Sears® store while another acquirer has the indicator "XYZ" for a Dairy Queen® store.

At step 604, the GUID for the merchant 110 is optionally determined using the data characterizing the transaction, for example, the determination can occur if the GUID for the merchant 110 is not in the received data. An algorithm can be used to determine the GUID for the merchant 110. For example, a code for the merchant 110 that is nonunique within the payment processing system, the merchant's 110 address, a GUID for the acquirer, or a combination of the foregoing may serve as input to the algorithm to determine the GUID for the merchant 110. To illustrate, the data characterizing the transaction may include a Wells Fargo® merchant code "XYZ" as the merchant's 110 code and the information that the merchant's 110 acquirer is Wells Fargo® branch number 603 located in Chandler Ariz. An algorithm can be used to determine the merchant's 110 GUID given "XYZ" and the Wells Fargo® branch number because the algorithm may include computer code for accessing a database linking acquirers, their respective merchant codes, and the GUID for the merchant 110. The transaction handler 106 may have assigned the GUID for the merchant 110 for example, by using the algorithm to determine the GUID for the merchant 110.

Multiple identifiers, such as a plurality of the merchant GUIDs, the account GUIDs, or the commodity GUIDS, may be stored in a database. For example, a loyalty program database may contain a plurality of merchant GUIDs that exist in the payment processing system. Moreover, the merchant GUIDs of those merchants 110 that are participants in a loyalty program 114 can be associated with the loyalty program 114 within the loyalty program database. Similarly, the account GUIDs of those consumers 102 that are participants in the loyalty program 114 can be associated with the loyalty program 114 within the loyalty program database and the commodity GUIDs of those commodities that are participants in the loyalty program 114 can be associated with the loyalty program 114 within the loyalty program database. The loyalty program database can be a network of multiple databases that are either co-located or geographically dispersed. The transaction handler 106 may maintain the loyalty program database.

Moreover, an incentive for a loyalty program, such as the incentive for the loyalty program 114, may be stored in the loyalty program database. For example, the loyalty program business rule may be stored the loyalty program database such that the incentive may be calculated. The incentives for each of the corresponding loyalty programs, such as loyalty program 114, may be associated with the corresponding loyalty programs within the loyalty program database.

Therefore, a GUID, such as the merchant GUID, may be used as a search term within the loyalty program database to facilitate determining if the transaction is eligible for an incentive of the loyalty program 114 and determining a value of the incentive of the loyalty program 114. For example, a search within the loyalty program database using the account GUID as a search term may reveal that the consumer 102 with the account GUID is one of the participants of the loyalty program 114 and that the incentive for loyalty program 114 is a $10 U.S. credit toward the consumer's 102 account associated with the account GUID if the consumer makes a purchase at the merchant's 110 store.

At step 606, a determination is made as to whether the transaction is eligible for the incentive of a loyalty program, such as the loyalty program 114, by using a GUID matching algorithm. Step 606 may include determining whether the merchant 110, the account of the consumer 102, the commodity purchased, or a combination of the forgoing are participants of the loyalty program 114 by matching the data characterizing the transaction, such as the GUID for the merchant 110, with corresponding GUIDs stored in the loyalty program database. Parameters of the loyalty program business rule may determine how many components of the data characterizing the transaction should be matched with the corresponding GUIDs in the loyalty program database to satisfy becoming eligible for the incentive.

For example, the loyalty program business rule may have parameters such that both the account and the merchant 110 must be participants of the loyalty program 114 for the transaction to be eligible for the incentive of the loyalty program 114. The determination of the eligibility may entail matching both the account GUID and the GUID for the merchant 110 characterizing the transaction against a plurality of account GUIDs and merchant GUIDs respectively in the loyalty program database. The loyalty program database of account GUIDs and merchant GUIDs may associate at least some of the GUIDs with various transaction programs, such as the loyalty program 114. Consequently, when a match exists, information about the transaction program can be obtained and a determination made as to what loyalty program 114 he merchant 110 or the account used in the transaction may be a participant of.

To illustrate, the consumer 102 may be a participant of a Neiman Marcus® apparel loyalty program. The consumer 102 may purchase a pair of shoes from Neiman Marcus® store #33 using the consumer's 102 Neiman Marcus® credit card account. If at step 606 the consumer's 102 Neiman Marcus® credit card account number is matched with a credit card number within the loyalty program database of account numbers, information can be obtained about the transaction programs that the consumer's 102 Neiman Marcus® credit card account may be a participant of. If the Neiman Marcus® apparel loyalty program is one of the transaction programs that the Neiman Marcus® credit card account is a participant of, the consumer 102 may be eligible for receiving an incentive of the Neiman Marcus® apparel loyalty program. Similarly, if the GUID for Neiman Marcus® store #33 matches with a GUID for Neiman Marcus® store #33 in the loyalty program database of GUIDs for merchants, it can be determined whether the Neiman Marcus® store #33 is part of the Neiman Marcus® apparel loyalty program.

Moreover, the Neiman Marcus® apparel loyalty program may be such that only Salvatore Ferragamo® brand shoes qualify for the Neiman Marcus® apparel loyalty program. The data characterizing the transaction may have a GUID for the merchant's 110 commodity (e.g., Salvatore Ferragamo® shoes) such as a SKU number. The SKU number can be matched against a database, such as the loyalty program database, of SKU numbers to determine if the commodity is a participant of the loyalty program. In the example, above, if the consumer 102 purchased the pair of Salvatore Ferragamo® shoes, the SKU would match the SKUs in the database; thus the transaction would be a transaction that is eligible toward the incentive of the Neiman Marcus® apparel loyalty program.

At step 608, the incentive (e.g., reward) for the loyalty program 114 is derived for the transaction that is eligible for the incentive. The incentive can be derived using the loyalty program business rule for the loyalty program 114. The loyally program implementer may use the loyalty program business rule for the loyalty program 114 to determine the value of the incentive for the loyalty program 114.

One of the collaborative constituents may have developed the loyalty program business rule. For example, the merchant 110 may have developed a business rule for the Neiman Marcus® appeal loyalty program such that the consumer 102 may receive $10 U.S. credit toward the consumer's 102 Neiman Marcus® credit card account when the consumer 102 purchases a pair of Salvatore Ferragamo® shoes at Neiman Marcus® store #33.

One of the loyalty program implementers may facilitate the fulfillment of the incentive. For example, the transaction handler 106 may facilitate the application of a statement credit to the consumer's 102 account, if the loyalty program business rule so delineates. Alternatively or in combination, the facilitation may entail assisting other loyalty program implementers to fulfill the incentive, such as by reporting the value of the incentive to a third party agency.

At step 610, information regarding the derived incentive may be transmitted. For example, the value of the derived incentive, the date the derived incentive was redeemed, the time the derived incentive was redeemed, past incentive that have been derived for the loyalty program 114 can be included in a formed transmission addressed to the merchant 110 corresponding to the merchant GUID within the data characterizing the transaction.

The transmission may be sent to the merchant 110, the loyalty program implementer, the third party agency, or the consumer 102. For example, the consumer 102 may receive a report of all derived loyalty program incentives that have been applied to the consumer's 102 account for the past year. Similarly, reports can be derived for transactions involving the merchant 110 and transmitted to the collaborating constituents to facilitate refining the loyalty program 114. The transmission may be created through the use of a computing device, a telecommunication device, the portable consumer device 502, or combinations thereof.

The data characterizing the transaction or the information regarding the derived incentive may be stored in a database, such as the loyalty program database. For example, the shopping trends of the consumer 102 may be analyzed using the loyalty program database containing the information regarding the derived incentive and the data characterizing the transaction.

Information on incomplete matches may be stored and communicated to the merchant 110, the consumer 102, or a combination thereof. For example, the loyalty program 114 may have a loyalty program business rule indicating that if the consumer 102 makes a purchase of chairs at the merchant's 110 store, the consumer 102 may receive cash back for ten (10) percent of the purchase price. Consequently, in this example, in order for a transaction to be eligible for the incentive of the loyalty program 114, each of the merchant GUID, the commodity GUID for the chairs, and the account GUID (or account GUID) in the transaction must match corresponding the merchant GUID for the merchant 110 in the loyalty program database, the commodity GUID for the chairs in the loyalty program database, and the account GUID for the consumer 102 in the loyalty program database. If any of the merchant GUID, the commodity GUID, or the account GUID do not match, the transaction is not eligible for the incentive of the loyalty program 114; however, the consumer 102 may potentially get the incentive of the loyalty program 114 to incent the consumer 102 to change their commercial behavior such that the remaining variables of the loyalty program business rule are satisfied. Consequently, a potential incentive may exist when the loyalty program business rule is partially satisfied. A transmission can be formed having information on the potential incentive, such as information on the variables that remain unmatched between the data characterizing the transaction and the various GUIDs that are stored in the loyalty program database. The transmission may be addressed to the merchant 110 or the consumer 102.

To illustrate, the consumer 102 may go into a furniture store that is merchant 110. Both the consumer 102 and the merchant 110 may be participants in the merchant's 110 loyalty program for chairs. The consumer 102 purchases a table at the merchant's 110 store. At the POS, the merchant 102 receives a transmission indicating the consumer 102 is a member of the merchant's 110 loyalty program for chairs. The merchant 110 may convey to the consumer 102 that if the consumer also purchases the chairs that go with the table, the consumer 102 may receive a ten (10) percent cash back incentive.

Alternatively, or in combination, the information on the incomplete matches can be accumulated in a manner that can be retrieved based on a characteristic of the information on the incomplete matches. An algorithm can be used to store the information on the incomplete matches in the loyalty program database or to filter the information on the incomplete matches. For example, the algorithm may filter the information on the incomplete matches such that only those incomplete matches involving merchant 110 are retrieved in a set. The set can then be transmitted to the merchant 110. Given the set, the merchant 110 may refine the parameters of the loyalty program 114 to better capture sales potentials and increase sale value.

Various terms may be used herein, which are to be understood according to the following descriptions 1 through 8:

1. Point of Service (POS) devices includes a device capable of communicating with a payment device, where the POS device can include a cellular phone, personal digital assistant (PDA), a pager, a security card, an access card, a smart media, a transponder, personal computer (PC), tablet PC, handheld specialized reader, set-top box, electronic cash register (ECR), automated teller machine (ATM), virtual cash register (VCR), kiosk, security system, or access system;

2. Account holder or consumer includes any person or entity with an account and/or a payment device associated with an account, where the account is within a transaction processing system;

3. Issuer includes any entity that issues one or more accounts and/or payment devices;

4. Merchant includes any entity that supports an POS device;

5. Participant includes any consumer, person, entity, charitable organization, machine, hardware, software, merchant or business who accesses and uses the system of the invention, such as any consumer (such as primary member and supplementary member of an aggregate consumer account), retailer, manufacturer, and third-party provider, and any subset, group or combination thereof;

6. Redemption includes obtaining a reward using any portion of points, coupons, cash, foreign currency, gift, negotiable instruments, or securities;

7. Reward includes any discount, credit, good, service, package, event, experience (such as wine tasting, dining, travel), or any other item; and 8. Portable consumer device includes a card, smartcard, ordinary credit or debit cards (with a magnetic strip and without a microprocessor), a keychain device (such as the SPEEDPASS® commercially available from Exxon-Mobil Corporation), cellular phone, personal digital assistant (PDA), pager, payment card, security card, access card, smart media, or transponder, where each portable consumer device can include a loyalty module with a computer chip with dedicated hardware, software, embedded software, or any combination thereof that is used to perform actions associated with a loyalty program.

It should be understood that the present invention can be implemented in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods to implement the present invention.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A method, comprising:

storing loyalty data for a loyalty program in a database, wherein the loyalty data includes a globally unique identifier (GUID) for a merchant within a transaction processing system and an account identifier for an account of a consumer in the transaction processing system, wherein the GUID is to be used in a plurality of transactions, and wherein the GUID and the account identifier are each associated with the loyalty program;

subsequent to the storing of the GUID, receiving data characterizing a transaction between the consumer and the merchant, the transaction using the account;

determining whether the received data contains the GUID;

in response to a determination that the received data does not contain the GUID, deriving the GUID using the received data;

identifying, via a computing device, an incentive in the loyalty program for the transaction by matching the loyalty data with the received data using the derived GUID and the account identifier, wherein the incentive is to be applied to the transaction;

forming a transmission including the incentive and addressed to the consumer; and forming a transmission addressed to the merchant, the transmission including information regarding the incentive.

2. The method as defined in claim 1, further comprising receiving the transaction from an acquirer, and communicating the transaction to an issuer for payment by the consumer.

3. The method as defined in claim 1, wherein the identifying the incentive further includes using a commodity identifier for a commodity involved in the transaction, and wherein the commodity identifier is associated with the loyalty program.

4. The method as defined in claim 1, wherein the loyalty program comprises a plurality of business rules, and the identifying the incentive further includes using the plurality of business rules.

5. The method as defined in claim 1, wherein the deriving the GUID comprises deriving the GUID from an algorithm that categorizes the merchant into a merchant category for which there is a corresponding merchant code.

6. The method as defined in claim 1, further comprising deriving the incentive from the database.

7. A system, comprising:

at least one processor; and memory storing a database comprising a plurality of merchant globally unique identifiers (GUIDs), a plurality of account identifiers, a plurality of commodity identifiers, and a plurality of incentives for a plurality of loyalty programs, each of the GUIDs corresponding to a respective merchant and associated with at least one of the loyalty programs, each GUID to be used for a plurality of transactions of the respective merchant, each of the account identifiers corresponding to a respective account, and each of the commodity identifiers corresponding to a respective commodity;

wherein the memory further stores instruction to instruct at least one processor to:

subsequent to storing the GUIDs, receive a notice of a first transaction between a first merchant and a first consumer for a first commodity, wherein the notice includes characterizing the first transaction by a first account identifier of the plurality of account identifiers associated with an account of the first consumer, and a first commodity identifier of the plurality of commodity identifiers corresponding to the first commodity;

determine whether the received contains a first GUID of the plurality of GUIDs for the first merchant;

in response to a determination that the first data does not contain the first GUID, derive the first GUID using the received data;

identify a first incentive of the plurality of incentives by matching the received with loyalty data stored in the database for the plurality of loyalty programs, the matching using the first GUID, the first account identifier, and the first commodity identifier; and form a transmission identifying the first incentive and addressed to at least one of the first merchant and the first consumer.

8. The system as defined in claim 7, wherein the identifying the first incentive comprises using at least one loyalty program business rule to determine a value of the first incentive.

9. The system as defined in claim 7, wherein the instructions are further configured to instruct the at least one processor to receive an assignment of each of the GUIDs.

10. A non-transitory computer-readable medium storing computer readable instructions which, when executed by a computer, cause the computer to:

store a merchant identifier for a merchant within a payment processing system, the identifier being globally unique within the payment processing system and the identifier to be used for a plurality of transactions of the merchant;

subsequent to the storing the merchant identifier, receive notice including data that a consumer charged a commodity to an account of the consumer within the payment processing system in a transaction with the merchant;

determine, via the computer, whether the received data contains the merchant identifier;

in response to a determination that the received data does not contain the merchant identifier, derive the merchant identifier using the received data;

identify in a database respective identifiers for each of the merchant, the account, the commodity, and a loyalty program incentive to award to the consumer for charging the commodity on the account, wherein the identifying the respective identifier for the merchant comprises using the merchant identifier as a search term; and reward the consumer, after the receiving and the identifying, with the loyalty program incentive.

11. The computer-readable medium as defined in claim 10, wherein the loyalty program incentive is selected from the group consisting of:

providing a discount toward the transaction at a point of service (POS) of the merchant;

providing a second commodity at the POS free of charge;

providing cash at the POS; and providing a pre-loaded second account at the POS.

12. The computer-readable medium as defined in claim 10, wherein the instructions further cause the computer to:

store data in the database, the data comprising a plurality of merchant globally unique identifiers (GUIDs), a plurality of account identifiers, a plurality of commodity identifiers, and a plurality of incentives, each of the GUIDs corresponding to a respective merchant and at least one of a plurality of loyalty programs, each of the account identifiers corresponding to a respective account and at least one of the loyalty programs, and each of the commodity identifiers corresponding to a respective commodity and at least one of the loyalty programs; and wherein the identifying the respective identifier for the loyalty program incentive includes matching data characterizing the transaction with the respective identifiers for each of the merchant, the account, and the commodity.

13. A method, comprising:

storing a globally unique identifier (GUID) for a merchant within a transaction processing system, the GUID to be used for a plurality of transactions of the merchant;

receiving data characterizing a first transaction between a consumer and the merchant, wherein the first transaction is to be processed within the transaction processing system;

determining whether the data contains the GUID;

in response to a determination that the data does not contain the GUID, deriving, via a computing device, the GUID using the received data;

determining, via the computing device, whether the first transaction is eligible for a loyalty program using the derived GUID, the loyalty program including a plurality of rules;

in response to a determination that the first transaction is eligible for the loyalty program, determining an incentive for the first transaction using the plurality of rules, wherein the incentive is to be applied to the first transaction; and forming a transmission to the merchant, the transmission including information regarding the incentive.

14. The method as defined in claim 13, wherein the GUID is derived from an algorithm that categorizes the merchant into a merchant category for which there is a corresponding merchant code.

15. The method as defined in claim 13, wherein the GUID is derived using another identifier in the transaction processing system for an acquirer of the merchant.

16. The method as defined in claim 15, wherein the GUID is derived further using an address or geographic location of the merchant.

17. The method as defined in claim 15, wherein the GUID is derived further using another identifier of the merchant, the another identifier being non-unique within the transaction processing system.

18. The method as defined in claim 13, wherein a first rule of the plurality of rules requires that the merchant and the consumer are each a participant of the loyalty program.

19. The method as defined in claim 13, further comprising transmitting information regarding the incentive to the consumer.

20. The method as defined in claim 13, further comprising in response to a determination that a second transaction is not eligible for the loyalty program, sending a transmission to the merchant or the consumer including information regarding a first rule of the plurality of business rules that is only partially satisfied, thereby informing the merchant or the consumer of a potential incentive associated with the second transaction.

21. A non-transitory computer-readable medium storing computer readable instructions which, when executed by a computer, cause the computer to:

store a globally unique identifier (GUID) for a merchant to be used in a plurality of transactions within a transaction processing system;

subsequent to the storing of the GUID, receive data characterizing a first transaction between a consumer and the merchant, wherein the first transaction is processed within the transaction processing system;

determine, via the computer, whether the data contains the GUID for the merchant;

in response to a determination that the data does not contain the GUID, derive the GUID using the received data;

determine whether the first transaction is eligible for a loyalty program using the derived GUID, the loyalty program including a plurality of rules; and in response to a determination that the first transaction is eligible for the loyalty program, determine an incentive for the first transaction using the plurality of rules.

22. The computer-readable medium as defined in claim 21, wherein the deriving the GUID comprises using a geographic location of the merchant and another identifier in the transaction processing system for an acquirer of the merchant.

\* \* \* \* \*